(12) United States Patent
Gerrity et al.

(10) Patent No.: US 10,733,396 B2
(45) Date of Patent: *Aug. 4, 2020

(54) SYSTEMS AND METHODS FOR SCANNING A USER ENVIRONMENT AND EVALUATING DATA OF INTEREST

(71) Applicant: Elwha LLC, Bellevue, WA (US)

(72) Inventors: Daniel A. Gerrity, Seattle, WA (US); William Gates, Medina, WA (US); Pablos Holman, Seattle, WA (US); Roderick A. Hyde, Redmond, WA (US); Muriel Y. Ishikawa, Livermore, CA (US); Edward K. Y. Jung, Las Vegas, NV (US); Jordin T. Kare, San Jose, CA (US); Royce A. Levien, Lexington (GB); Richard T. Lord, Federal Way, WA (US); Robert W. Lord, Seattle, WA (US); Mark A. Malamud, Seattle, WA (US); Nathan P. Myhrvold, Bellevue, WA (US); John D. Rinaldo, Jr., Bellevue, WA (US); Keith D. Rosema, Olympia, WA (US); Clarence T. Tegreene, Mercer Island, WA (US); Thomas Allan Weaver, San Mateo, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/018,295

(22) Filed: Jun. 26, 2018

(65) Prior Publication Data
US 2018/0307878 A1 Oct. 25, 2018

Related U.S. Application Data

(63) Continuation of application No. 15/677,489, filed on Aug. 15, 2017, now Pat. No. 10,007,820, which is a
(Continued)

(51) Int. Cl.
| | | |
|---|---|---|
| *G06K 7/10* | (2006.01) | |
| *G06F 3/03* | (2006.01) | |
| *G02B 27/01* | (2006.01) | |

(52) U.S. Cl.
CPC ....... *G06K 7/10366* (2013.01); *G02B 27/017* (2013.01); *G06F 3/0304* (2013.01);
(Continued)

(58) Field of Classification Search
None
See application file for complete search history.

(56) References Cited

U.S. PATENT DOCUMENTS

| | | |
|---|---|---|
| 6,036,086 A | 3/2000 | Sizer, II et al. |
| 7,287,696 B2 | 10/2007 | Attia et al. |

(Continued)

OTHER PUBLICATIONS

Office Action dated Sep. 9, 2013 for U.S. Appl. No. 13/410,146, filed Mar. 1, 2012.
(Continued)

*Primary Examiner* — Nabil H Syed

(57) ABSTRACT

According to various embodiments, a mobile device continuously and/or automatically scans a user environment for tags containing non-human-readable data. The mobile device may continuously and/or automatically scan the environment for tags without being specifically directed at a particular tag. The mobile device may be adapted to scan for audio tags, radio frequency tags, and/or image tags. The mobile device may be configured to scan for and identify tags within the user environment that satisfy a user prefer-
(Continued)

ence. The mobile device may perform an action in response to identifying a tag that satisfies a user preference. The mobile device may be configured to scan for a wide variety of tags, including tags in the form of quick response codes, steganographic content, audio watermarks, audio outside of a human audible range, radio frequency identification tags, long wavelength identification tags, near field communication tags, and/or a Memory Spot device.

18 Claims, 20 Drawing Sheets

Related U.S. Application Data continuation of application No. 15/334,088, filed on Oct. 25, 2016, now Pat. No. 9,734,369, which is a continuation of application No. 14/924,598, filed on Oct. 27, 2015, now Pat. No. 9,477,864, which is a continuation of application No. 13/410,141, filed on Mar. 1, 2012, now Pat. No. 9,170,656.

(52) U.S. Cl.
CPC ...... *G06F 3/0317* (2013.01); *G02B 2027/014* (2013.01); *G02B 2027/0138* (2013.01); *G02B 2027/0178* (2013.01)

(56) References Cited

U.S. PATENT DOCUMENTS

| | | | |
|---|---|---|---|
| 7,295,114 B1 | 11/2007 | Drzaic | |
| 7,304,585 B2 | 12/2007 | Suomela et al. | |
| 7,309,015 B2 | 12/2007 | Frantz et al. | |
| 7,890,434 B2 | 2/2011 | Narayanaswami et al. | |
| 8,666,895 B2* | 3/2014 | Grigg | G06Q 20/20 235/380 |
| 8,708,223 B2 | 4/2014 | Gates et al. | |
| 9,170,656 B2 | 10/2015 | Gates et al. | |
| 2002/0068585 A1 | 6/2002 | Chan et al. | |
| 2002/0143624 A1* | 10/2002 | Catan | G06Q 20/342 705/14.26 |
| 2003/0234288 A1 | 12/2003 | Canipe et al. | |
| 2004/0182925 A1 | 9/2004 | Anderson et al. | |
| 2005/0113649 A1* | 5/2005 | Bergantino | G06F 19/3475 600/300 |
| 2005/0203854 A1 | 9/2005 | Das et al. | |
| 2005/0230469 A1 | 10/2005 | Mondie | |
| 2006/0086796 A1 | 4/2006 | Onogi | |
| 2006/0267730 A1 | 11/2006 | Steinke | |
| 2007/0061497 A1 | 3/2007 | Takatsuka | |
| 2007/0090185 A1 | 4/2007 | Lewkowitz et al. | |
| 2007/0143256 A1 | 6/2007 | Starr | |
| 2007/0233785 A1 | 10/2007 | Abraham et al. | |
| 2007/0290037 A1 | 12/2007 | Arellanes et al. | |
| 2008/0082353 A1 | 4/2008 | Hudetz et al. | |
| 2008/0172610 A1* | 7/2008 | Blair | G06F 3/023 715/700 |
| 2008/0177665 A1 | 7/2008 | Noordam | |
| 2008/0284600 A1 | 11/2008 | Drzaic et al. | |
| 2009/0066476 A1 | 3/2009 | Raheman | |
| 2009/0067622 A1 | 3/2009 | Yao et al. | |
| 2009/0108071 A1 | 4/2009 | Carlson | |
| 2009/0212113 A1 | 8/2009 | Chiu et al. | |
| 2009/0216549 A1 | 8/2009 | Causey | |
| 2010/0072280 A1 | 3/2010 | McGill et al. | |
| 2010/0085193 A1 | 4/2010 | Boss et al. | |
| 2010/0088170 A1 | 4/2010 | Glore, Jr. | |
| 2010/0102953 A1* | 4/2010 | Chou | G08B 21/24 340/539.11 |
| 2010/0121567 A1 | 5/2010 | Mendelson | |
| 2010/0125491 A1 | 5/2010 | Elliott et al. | |
| 2010/0258618 A1* | 10/2010 | Philbrick | G06K 19/06 235/375 |
| 2011/0029362 A1* | 2/2011 | Roeding | G06Q 30/00 705/14.13 |
| 2011/0065376 A1* | 3/2011 | Forutanpour | H04W 4/185 455/3.01 |
| 2011/0082747 A1 | 4/2011 | Khan et al. | |
| 2011/0153398 A1 | 6/2011 | Thjai et al. | |
| 2011/0214143 A1 | 9/2011 | Rits et al. | |
| 2011/0238985 A1 | 9/2011 | Sovio et al. | |
| 2011/0291814 A1* | 12/2011 | Faith | G01S 5/0226 340/10.5 |
| 2012/0005222 A1 | 1/2012 | Bhagwan et al. | |
| 2012/0061470 A1 | 3/2012 | Marguerettaz et al. | |
| 2012/0132706 A1* | 5/2012 | McKenzie | G06Q 10/04 235/380 |
| 2012/0187184 A1 | 7/2012 | Challa et al. | |
| 2012/0216226 A1 | 8/2012 | Humphrey et al. | |
| 2012/0218084 A1 | 8/2012 | Arponen et al. | |
| 2012/0232977 A1* | 9/2012 | Calman | G06Q 30/0251 705/14.25 |
| 2013/0041758 A1* | 2/2013 | Mikan | G06Q 30/02 705/14.66 |
| 2013/0048708 A1* | 2/2013 | Aihara | G06Q 30/0631 235/375 |
| 2013/0073359 A1* | 3/2013 | Caplan | G06Q 30/06 705/14.16 |
| 2013/0073371 A1* | 3/2013 | Bosworth | G06Q 30/02 705/14.35 |
| 2013/0230178 A1 | 9/2013 | Gates et al. | |
| 2014/0231506 A1 | 8/2014 | Gerrity et al. | |

OTHER PUBLICATIONS

Notice of Allowance dated Jan. 8, 2014 for U.S. Appl. No. 13/410,146, filed Mar. 1, 2012.
Office Action dated Sep. 2, 2014 for U.S. Appl. No. 13/410,151, filed Mar. 1, 2012.
Office Action dated Feb. 13, 2015 for U.S. Appl. No. 13/410,151, filed Mar. 1, 2012.
Office Action dated May 22, 2015 for U.S. Appl. No. 13/410,151, filed Mar. 1, 2012.
Notice of Allowance dated Oct. 26, 2015 for U.S. Appl. No. 13/410,151, filed Mar. 1, 2012.
Office Action dated Mar. 27, 2014 for U.S. Appl. No. 13/410,141, filed Mar. 1, 2012.
Office Action dated Dec. 17, 2014 for U.S. Appl. No. 13/410,141, filed Mar. 1, 2012.
Office Action dated Apr. 15, 2015 for U.S. Appl. No. 13/410,141, filed Mar. 1, 2012.
Notice of Allowance dated Aug. 21, 2015 for U.S. Appl. No. 13/410,141, filed Mar. 1, 2012.
Office Action dated Mar. 30, 2015 for U.S. Appl. No. 14/265,243, filed Apr. 29, 2014.
Notice of Allowance dated Nov. 12, 2015 for U.S. Appl. No. 14/265,243, filed Apr. 29, 2014.
Office Action dated May 26, 2016 for U.S. Appl. No. 14/924,598, filed Oct. 27, 2015.
Notice of Allowance dated Sep. 1, 2016 for U.S. Appl. No. 14/924,598, filed Oct. 27, 2015.

* cited by examiner

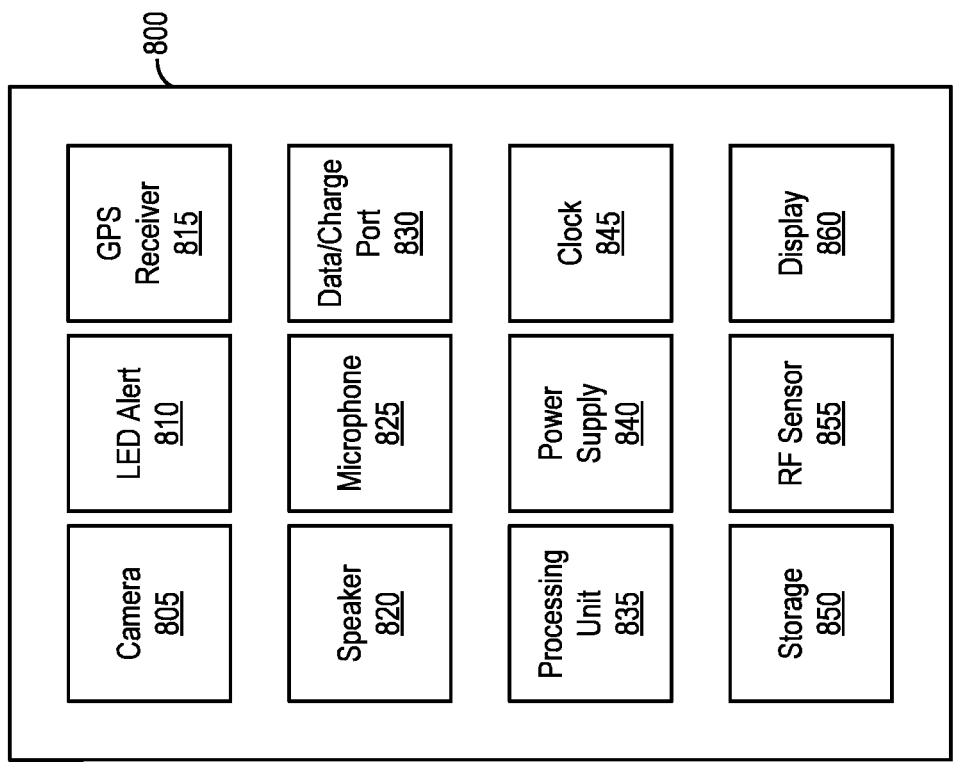
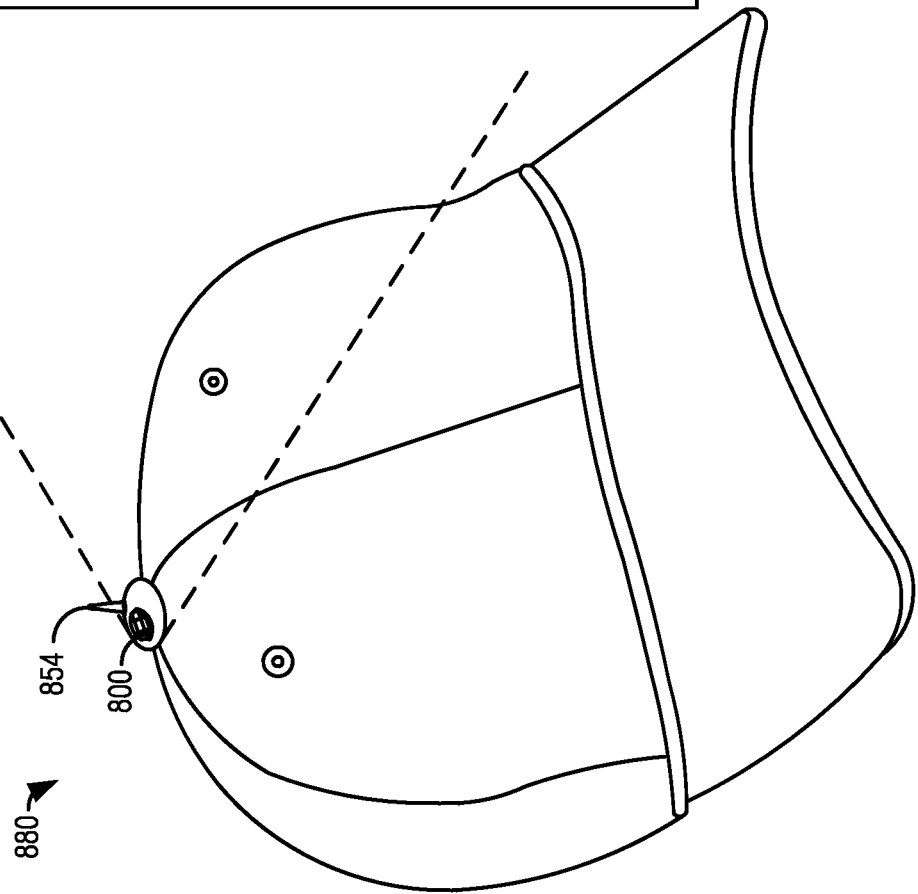
FIG. 8

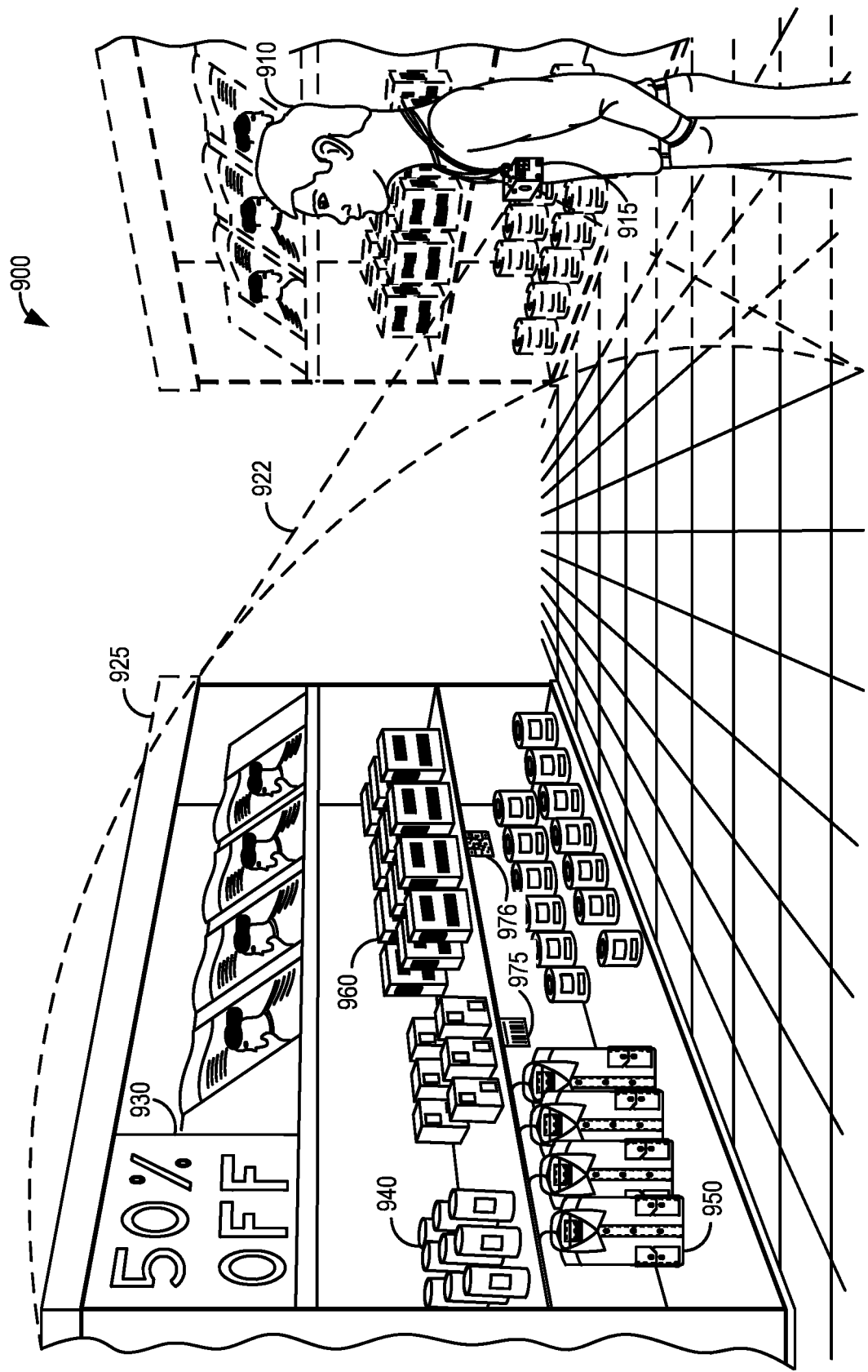

SYSTEMS AND METHODS FOR SCANNING A USER ENVIRONMENT AND EVALUATING DATA OF INTEREST

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

Priority Applications

This application is a continuation of U.S. patent application Ser. No. 15/677,489, filed Aug. 15, 2017, for SYSTEMS AND METHODS FOR SCANNING A USER ENVIRONMENT AND EVALUATING DATA OF INTEREST, now U.S. Pat. No. 10,007,820, which is a continuation of U.S. patent application Ser. No. 15/334,088, filed Oct. 25, 2016, for SYSTEMS AND METHODS FOR SCANNING A USER ENVIRONMENT AND EVALUATING DATA OF INTEREST, now U.S. Pat. No. 9,734,369, which is a continuation of U.S. patent application Ser. No. 13/410,141, filed Mar. 1, 2012, for SYSTEMS AND METHODS FOR SCANNING A USER ENVIRONMENT AND EVALUATING DATA OF INTEREST, now U.S. Pat. No. 9,177,600, all of which are incorporated herein by reference.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application. All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This disclosure relates to personal data capturing devices adapted to continuously and/or automatically scan a user's environment. Specifically, this disclosure relates to continuously and/or automatically scanning a user environment and aggregating data that may be of interest to a user.

SUMMARY

According to various embodiments, a mobile device continuously and/or automatically scans a user environment for tags containing non-human-readable data. The mobile device may continuously and/or automatically scan the environment for tags without being specifically directed at a particular tag. The mobile device may be adapted to scan for audio tags, radio frequency (RF) tags, and/or image tags. The mobile device may be configured to scan for and identify tags within the user environment that satisfy a user preference. The mobile device may perform an action in response to identifying a tag that satisfies a user preference. In some embodiments, user preferences are provided by the user, by a third party, based on social network information or location, and/or deduced from available information related to the user. The mobile device may be configured to scan for a wide variety of tags, including tags in the form of quick response (QR) codes, steganographic content, audio watermarks, audio outside of a human audible range, radio frequency identification (RFID) tags, long wavelength identification (LWID) tags, near field communication (NFC) tags, and/or a Memory Spot device. In some embodiments the mobile device scans tags within an environment and then utilizes an integrated computing device to identify tags that satisfy a user preference and perform an action in response to an identified tag. In other embodiments, the mobile device utilizes a remote computing device, such as a cloud computing device, to identify the tags that satisfy a user preference and/or perform actions in response to identified tags. The computing device may also verify the authenticity of the tag and/or decrypt a scanned tag.

BRIEF DESCRIPTION OF THE DRAWINGS

FIG. 8 is an exemplary embodiment of a personal mobile device integrated into a hat, the personal mobile device configured to continuously and/or automatically scan a user environment for data.

FIG. 9B illustrates the personal mobile device used to continuously and/or automatically scan the shelves of the retail establishment for image data with a wide field of view.

DETAILED DESCRIPTION

Figure 1:
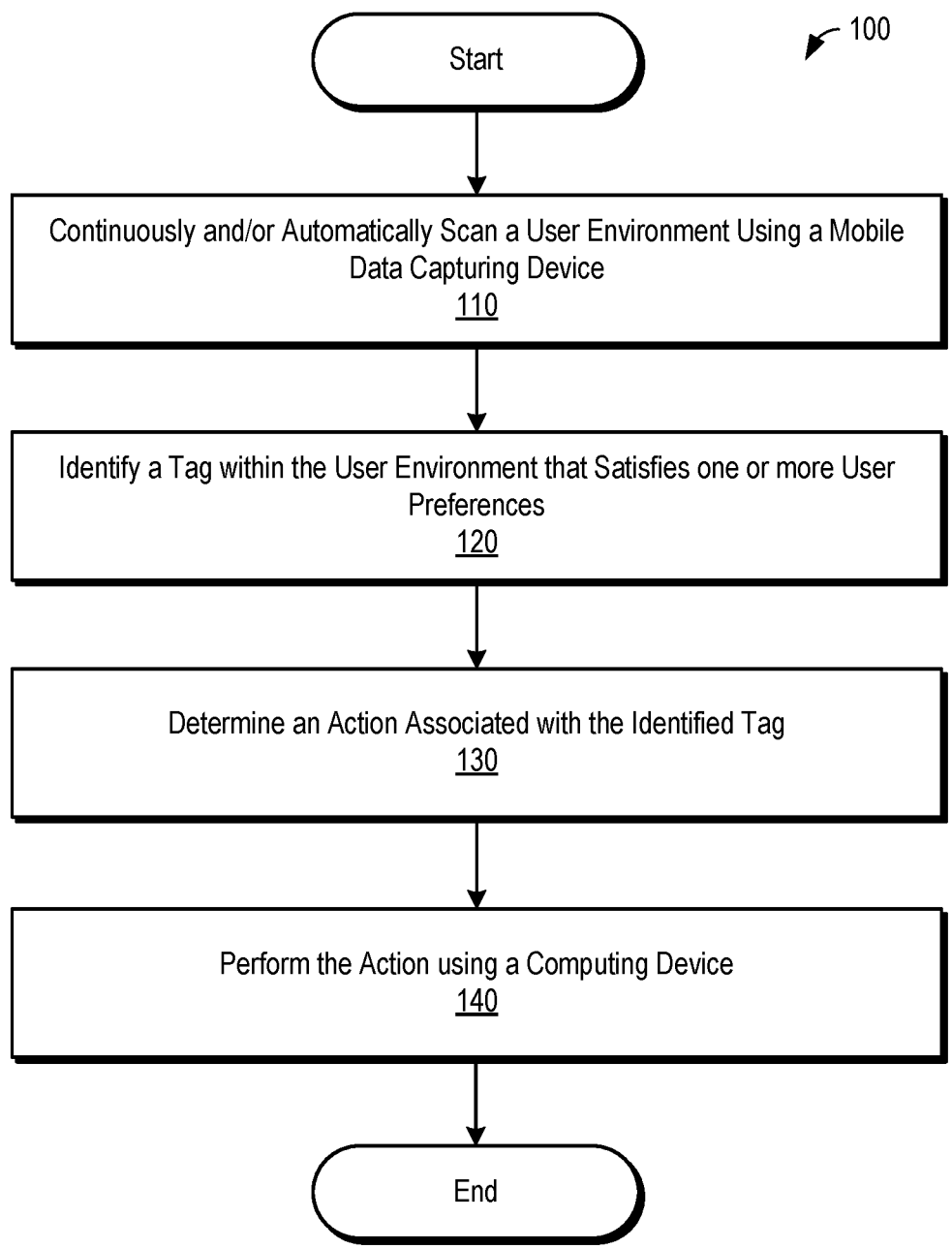
FIG. 1 illustrates a flow chart of an exemplary method for continuously and/or automatically scanning a user environment for data, evaluating the data, and performing a desired action in response to collected data.

A mobile device may continuously and/or automatically scan a user environment for tags containing non-human-readable data. The mobile device may scan for a wide variety of tags without being specifically directed at a particular tag, including tags in the form of QR codes, steganographic content, audio watermarks, audio outside of a human audible range, radio frequency identification (RFID) tags, long wavelength identification (LWID) tags, near field communication (NFC) tags, and/or a Memory Spot device. The mobile device may be adapted to scan for a wide variety of audio tags, radio frequency (RF) tags, and/or image tags.

The mobile device may automatically enhance a scanning parameter associated with the mobile device's ability to scan for tags. For example, the mobile device may adjust the aim of the mobile device (e.g., a steerable microphone), adjust the focus of the mobile device, adjust the field of view of the imaging device, adjust the exposure of the imaging device, and/or apply a noise-reduction or noise-canceling algorithm. The ability of the mobile device to enhance a scanning parameter may depend on the type of tag being detected. For example, in the case of a mobile imaging device, the mobile device may adjust an optical focus. In the case of a mobile device adapted to detect RF tags, the mobile device may adjust a sensor focal point or sensitivity to a specific frequency. In the case of a mobile device adapted to detect audio tags, the mobile device may adjust an auditory focus point within an environment, such as focusing on a particular speaker in an environment containing multiple speakers.

Once a tag has been scanned within the user environment, the mobile device may determine if the tag satisfies a user preference. In some embodiments, the mobile device may include an integrated computing device capable of processing the scanned tag to determine if it satisfies a user preference. In other embodiments, the mobile device may rely on a remote computing device, such as a cloud computing device. The user preferences may be specified by a user, based on historical user input, based on social network information associated with the user, based on an absolute or relative location of the user, and/or the date or time. For example, user preferences may include certain topics, brands, information types, advertisements, pricing, reviews, sale information, and/or other information as directly or indirectly specified by a user.

For instance, a user may be interested in rock climbing and may the topic of rock climbing may be incorporated as a user preference. Topics incorporated as user preferences may include topics that are broad and/or relatively narrow. For example, a broad topic such as a user's interest in horses may be a broad topic user preference. A user's interest in methods of shoeing horses during the eighteenth century may be a relatively narrow topic incorporated as a user preferences. Other topics may be related to food, clothing, work, hobbies, vacations, educational, animals, behavior, course curriculums, medical conditions, anthropology, politics, sports, science, arts, history, technology, news, and the like. Similarly, a user's interest in purchasing clothing, electronics, multimedia, and/or other consumer goods of a certain brand may be incorporated as a user preference. Such as, for example, a user's temporary interest in purchasing sunglasses of a particular brand name. A user's interest in brands associated with goods or services may be incorporated as user preferences.

The mobile device may perform an action in response to identifying a tag that satisfies one or more user preferences. For example, the mobile device may store or aggregate information from one or more tags. In one embodiment, the tag may contain or provide a link to supplemental content. The supplemental content may be in the form of informational data related to the tag, a filename, a web address, such as a universal resource locator (URL), an Internet protocol (IP) address, a media access control (MAC) address, an email address, a social network handle or address, a messaging address, a phone number, and/or other supplemental content. Supplemental content obtained from an identified tag may be directly provided to a user, stored for eventual retrieval, aggregated with related supplemental content or tags, and/or provided to the user in the aggregate with other related supplemental content or tags. Additionally, supplemental content obtained from an identified tag may be compared with supplemental content obtained from other tags, and/or historical data associated with the identified tag. For example, pricing information associated with an identified tag or set of tags may be compared to pricing information of associated tags previously scanned and/or with pricing information of associated tags stored in an accessible database.

In some embodiments, the mobile device may perform an action that includes notifying the user or a third party that a tag has been identified that satisfies one or more user preferences. For example, the mobile device may provide an audible alert or visual alert, send a message or email to a user, and/or update a webpage, database, blog, and/or social network site. The mobile device may additionally, or alternatively, notify a third party. For instance, the mobile device may transmit a purchase order, a request for a sample, a request for a coupon, and/or a request for additional information. Such an action may be automatically performed by the mobile device or after verification by the user. In response to identifying a tag that satisfies one or more user preferences, the mobile device may transmit information to a third party related to the user, such as demographic information, contact information, a username, a password, financial information, a user location, a user comment, social network information associated with the user, and/or other information related to the user. Such information may be provided to a third party anonymously or with personal identifying information.

The mobile device may be configured to continuously and/or automatically scan any of a wide variety of user environments for any of a wide variety of tags. User environments may include areas proximate the user, including areas within visual or audible range of the user, print media, audio media, visual media, store displays, and billboards. Additionally, the mobile device may be configured to continuously and/or automatically scan for RF tags within a predetermined range of a user. The mobile device may scan for tags in the form of visual tags, audio tags, and/or RF tags, including, but not limited to, bar codes, QR codes, steganographic content, audio watermarks, audio outside of a human audible, RFID tags, LWID tags, NFC tags, and/or Memory Spot devices. For example, a camera on a mobile device may be configured to scan for visual tags that are not visible to the human eye, such as infrared tags and ultraviolet tags.

In some embodiments, the mobile device includes an integrated computing device configured to identify tags that satisfy the one or more user preferences and perform actions in response to an identified tag. Alternatively, the mobile device may utilize a remote computing device, such as a cloud computing device, to identify the tags that satisfy a user preference and/or perform actions in response to identified tags. The computing device may also verify the authenticity of the tag and/or decrypt a scanned tag. The mobile device and/or the computing device may be integrated within and/or include a cellular telephone, a personal computer, a laptop, a tablet device, a wearable device, clothing, jewelry, headgear (such as eyeglasses, earphones, earbuds), a briefcase, and/or other portable accessory.

The mobile device may be configured to visually scan for image tags using a camera having a fixed or adjustable field of view. For example, the camera may have a wide angle lens, such as a fisheye lens, adapted to continuously and/or automatically scan a wide field of view. Alternatively, the camera may be configured to continuously and/or automatically scan a field of view approximating that of the user. The mobile device may alternatively, or additionally, be configured to continuously and/or automatically scan for audio tags using one or more microphones and/or scan for RF tags using one or more antennas.

As used herein, the term "automatically scanning" refers to scanning independent of, or without, user action once a device has been activated. For example, the mobile device may be initially activated by a user, after which the mobile device may scan the user's environment for one or more tags without additional user action. As used herein, the term "continuously scanning" refers to scanning without interruption once activated. For example, the mobile device may be initially activated by a user, after which the mobile device may scan the user's environment for one or more tags without interruption.

Some of the infrastructure that can be used with embodiments disclosed herein is already available, such as general-purpose computers, RF tags, RF antennas and associated readers, cameras and associated image processing components, microphones and associated audio processing components, computer programming tools and techniques, digital storage media, and communications networks. A computing device may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network.

In the exemplary embodiments depicted in the drawings, the size, shape, orientation, placement, configuration, and/or other characteristics of tags, computing devices, advertisements, cameras, antennas, microphones, and other aspects of mobile devices are merely illustrative. Specifically, mobile devices, computing devices, tags, and associated electronic components may be manufactured very small and may not necessarily be as obtrusive as depicted in the drawings. Moreover, image, audio, and RF tags, which may be significantly smaller than illustrated, may be less intrusively placed and/or configured differently from those depicted in the drawings.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once.

FIG. 1 illustrates a flow chart of an exemplary method 100 for continuously and/or automatically scanning a user environment for data, evaluating the data, and performing a desired action in response to collected data. A mobile device may continuously and/or automatically scan a user environment for tags containing non-human-readable data, at 110. The mobile device may be a stand-alone personal mobile device or integrated within a mobile telephone, a laptop, a tablet computer, or other portable electronic device. Alternatively the mobile device may be integrated within a user's clothing, headgear, briefcase, hat, jewelry, or other personal accessory. In one embodiment, the mobile device may include a camera configured to continuously and/or automatically scan for image tags. In one embodiment, the mobile device may include a microphone configured to continuously and/or automatically scan for audio tags. In one embodiment, the mobile device may include an RF antenna and an associated RF sensor configured to continuously and/or automatically scan for RF tags. The tags may be integrated within or associated with various products, advertisements, print material, solicitations, offers, and/or other marketing or informational materials.

A computing device may then identify a tag within the user environment that satisfies one or more user preferences, at 120. The computing device may be integrated within the mobile device. Alternatively, the mobile device may be in communication with a remote computing device, such as a computing device in a cloud computing environment, configured to identify the tag within the user environment. The computing device may then determine what action should be performed in association with the identified tag, at 130.

The computing device, alone or in conjunction with the mobile device, may perform the determined action, at 140. For example, the mobile device may provide an audible, visual, or haptic alert to the user that a tag satisfying one or more user preferences has been detected. Information from the tag, or supplemental information related to the tag, may be presented to the user via the mobile device. For instance, a display screen may present supplemental information related to an advertisement in a retail establishment. An email or other message related to the tag may be provided to the user.

Figure 2:
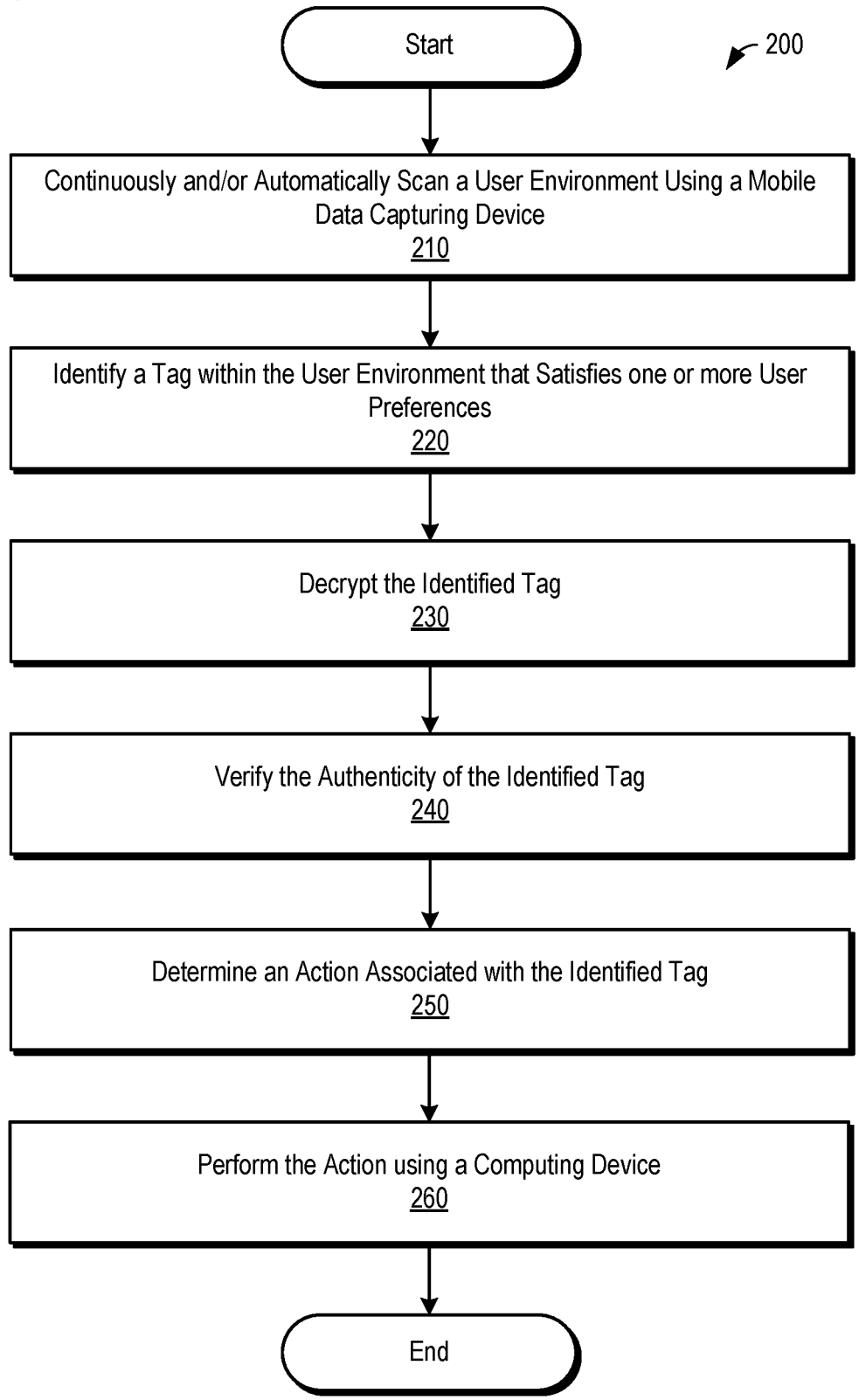
FIG. 2 is a flow chart of an exemplary method for continuously and/or automatically scanning a user environment for data, decrypting and verifying the data, and performing a desired action in response to collected data.

FIG. 2 is a flow chart of an exemplary method 200 for continuously and/or automatically scanning a user environment for data, decrypting and verifying the data, and performing a desired action in response to collected data. A mobile device may continuously and/or automatically scan a user environment for tags containing non-human-readable data, at 210. As an example, a personal mobile device may include a camera and be wearable. Accordingly, the mobile device may continuously and/or automatically scan an environment for image tags as a user wears the personal mobile device.

A computing device may then identify a tag within the user environment that satisfies one or more user preferences, at 220. As an example, as the user visits various retail establishments, the mobile device may continuously and/or automatically scan for image tags as the user wearing the personal mobile device visits various retail establishments. The user preferences may be specified by a user, based on historical user input, based on social network information associated with the user, based on an absolute or relative location of the user, and/or the date or time. The user preferences may include certain topics, brands, information types, advertisements, pricing, reviews, sale information, and/or other information as directly or indirectly specified by a user. Accordingly, as the user visits the various retail establishments, the mobile device may identify image tags that are associated with an item on sale, associated with a particular brand item, correspond to items purchased in the past, and/or are associated with user-provided preferences. In addition, the user preferences may include criteria such as the current location of the user, the current time and/or date, and image data proximate the tag. For example, user preferences may indicate an interest in all tags proximate a certain type of image, advertisement, topics, and/or the like.

The computing device may be integrated within the mobile device. Alternatively, the mobile device may be in communication with a remote computing device, such as a computing device in a cloud computing environment, configured to identify the tag within the user environment. The computing device may also decrypt the identified tag, at 230. It may be necessary to decrypt the tag, at 230, prior to identifying the tag, at 220. In some embodiments, it may be possible to identify the tag prior to decrypting the tag. In such embodiments, it may be necessary to decrypt supplemental content associated with an identified tag. The authenticity of the decrypted tag may also be verified by the computing device, at 240.

Various components and systems may utilize encryption and decryption algorithms in order to provide increased security. For example, transmission of data to or from the mobile device may be encrypted. In some embodiments, an scanned and/or identified tag may only be decrypted by authorized users. Accordingly, unauthorized users may not have access to the tag and/or supplemental content associated with a particular tag. In some embodiments, a user may be considered an authorize user based on the age of the user, a membership of the user, a subscription of the user, a fee paid by the user, and/or by other distinguishing characteristics. Tags may contain information encrypted using a plurality of different encryption keys, such that decrypting a tag may include decrypting an identified tag using a decryption key specific to a particular user.

Once the identified tag has been decrypted and verified, the computing device may determine an action that should be performed associated with the identified tag, at 250. The computing device, alone or in conjunction with the mobile device, may perform the determined action, at 260. For example, the mobile device may store or aggregate information from one or more tags. The tag itself may be recorded, or information from the tag may be recorded. Additionally, the context in which the tag was read may be recorded. Accordingly, the tag may be recorded, information obtained from the tag may be recorded, and/or the date, time, location, nearby imagery, and/or other contextual information may be recorded as well.

In one embodiment, the tag may contain or provide a link to supplemental content. The supplemental content may be in the form of informational data related to the tag, a filename, web address, such as a URL, an IP address, a MAC address, an email address, a social network handle or address, a messaging address, a phone number, and/or other supplemental content. Supplemental content obtained from an identified tag may be directly provided to the user, stored for eventual retrieval, aggregated with related supplemental content or tags, and/or provided to the user in the aggregate with other related supplemental content or tags.

In some embodiments, the mobile device performs an action that includes notifying or interacting with a third party. For example, the mobile device may notify a user that a tag has been identified that satisfies one or more user preferences. The mobile device may provide an audible alert, a visual alert, or a haptic alert, send a message or email to a user, and/or update a webpage, database, blog, and/or social network site. As another example, the mobile device may transmit a purchase order, a request for a sample, a request for a coupon, and/or a request for additional information. Such an action may be automatically performed by the mobile device or after verification by the user. The mobile device may notify a user that a tag has been identified that satisfies one or more user preferences and then perform a related second action. For example, once the user has been notified, the mobile device may perform a second follow-up action unless the user opts out, only if directed by the user, and/or based on a user selection of a second follow-up action. For instance, the mobile device may identify a tag offering a free sample of a product, the user may be notified that the free sample is available and that the free sample will be ordered unless the user opts out within a specified time frame.

In response to identifying a tag that satisfies one or more user preferences, the mobile device may transmit information to a third party related to the user, such as demographic information, contact information, a username, a password, financial information, and/or other information related to the user. Such information may be provided to a third party anonymously or with personal identifying information. The mobile device may communicate with the third party and receive instructions to perform a second follow-up action. For example, the mobile device may identify a tag that satisfies one or more user preferences and perform an action that includes communicating with a third party. The third party may direct the mobile device to perform a second action. The second, third-party-directed action may be automatically performed, performed only if the third party is a trusted third party, and/or performed only if the user authorizes the performance.

Figure 3:
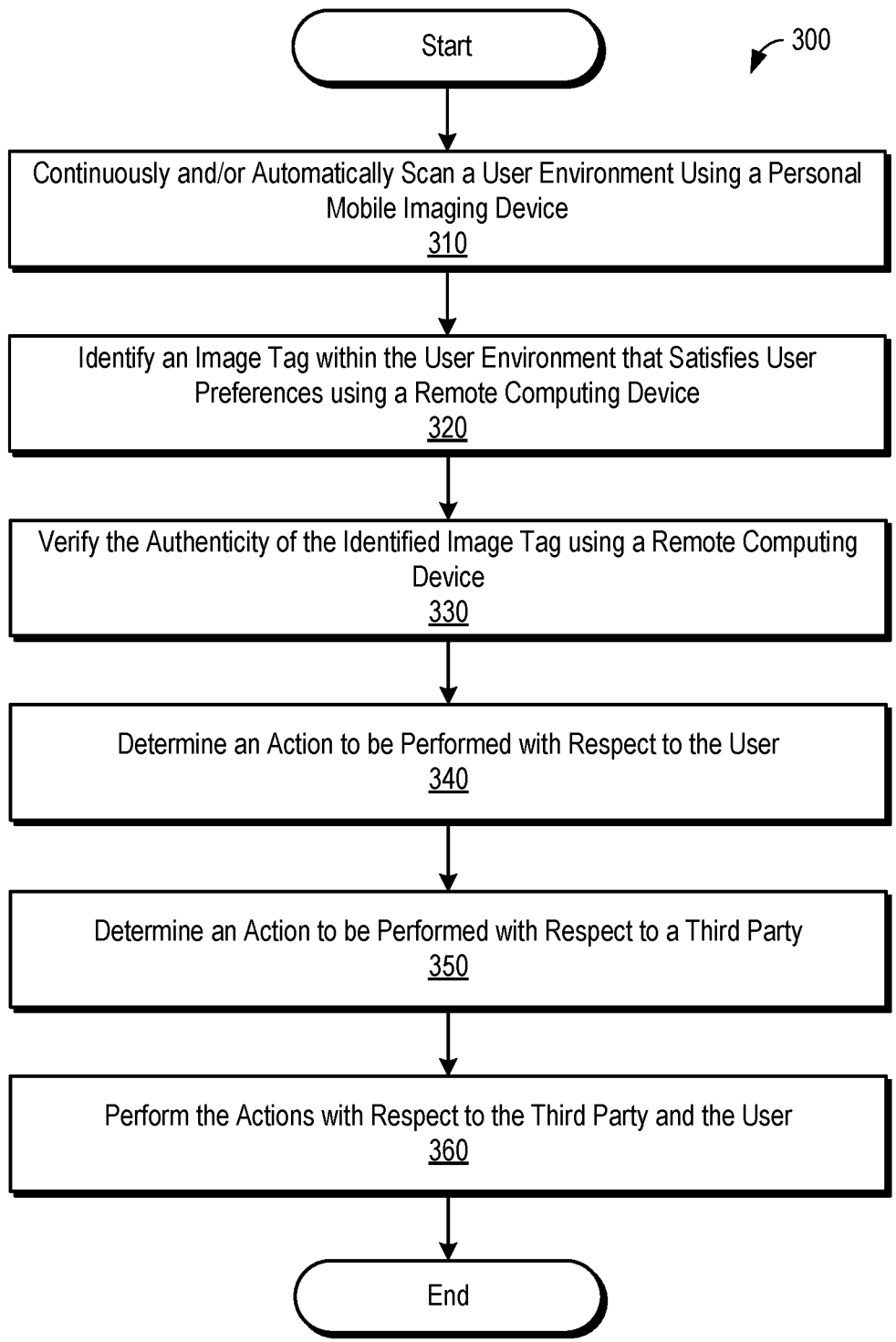
FIG. 3 is a flow chart of an exemplary method for continuously and/or automatically scanning a user environment for data using an imaging device and for performing a desired action in response to collected data.

FIG. 3 is a flow chart of an exemplary method 300 for continuously and/or automatically scanning a user environment for data using an imaging device and for performing a desired action in response to collected data. A personal mobile imaging device is used to continuously and/or automatically scan a user environment for image tags containing non-human-readable data, at 310. Alternatively, the personal mobile device may be adapted to scan the user environment for RF tags or audio tags.

A computing device associated with the personal mobile imaging device may identify an image tag within the user environment that satisfies one or more user preferences, at 320. The computing device may be a remote computing device or integrated within the personal mobile imaging device. The authenticity of the identified image tag may be verified by the remote computing device, at 330, by a third party, or by the user. The computing device may determine an action to be performed with respect to the user based upon the identified image tag, at 340. The computing device may also determine an action to be performed with respect to a third party based on the identified image tag, at 350. The action(s) with respect to each of the third party and the user may then be performed, at 360.

For example, the computing device, alone or in conjunction with the personal mobile imaging device, may provide an alert, purchase a product, request additional feedback from the user, request additional information related to the image tag from a third party, and/or otherwise interact with a third party and/or the user. In some embodiments, the personal mobile device aggregates information from a plurality of tags that satisfy one or more user preferences. The aggregate data, whether obtained directly from the image tags or from supplemental material associated with the plurality of tags, may then be presented to the user and/or a third party.

Figure 4:
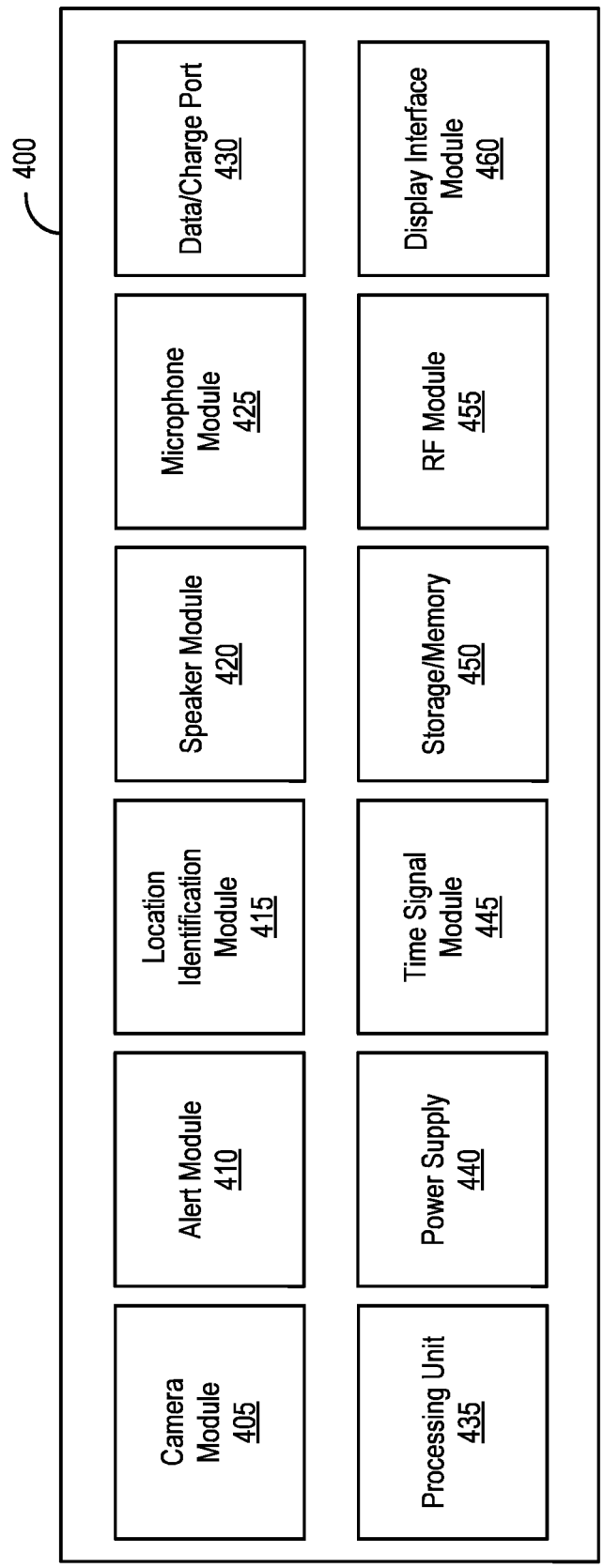
FIG. 4 is a functional block diagram of a mobile device that may be used to continuously and/or automatically scan a user environment for data and perform desired actions in response to collected data.

FIG. 4 is a functional block diagram of a mobile device 400 that may be used to continuously and/or automatically scan a user environment for data and perform desired actions in response to collected data. As illustrated, the mobile device 400 may include a camera module 405 configured to continuously and/or automatically scan a user environment for image tags. The camera module 405 may include various image processing hardware and/or software components. A camera in communication with the camera module 405 may include a fixed or adjustable field of view. In one embodiment, the camera may be configured with a field of view wider than that of a user, equal to that of a user, or narrower than that of a user. An alert module 410 may be configured to provide an audible, visual, vibration, and/or other haptic alert to a user. The alert module 410 may be utilized as part of an action performed in association with a tag that is determined to satisfy one or more user preferences. For example, the alert module 410 may include a light, an audible beep, a vibrator, a tactile response, haptic feedback, and/or other feedback mechanism.

The location identification module 415 may provide the mobile device 400 with relative and/or absolute location information. For example, the location identification module 415 may include a global positioning system (GPS) receiver. The location identification module 415 may additionally or alternatively be configured to receive or determine the relative location of the mobile device 400 with respect to a fixed object, such as a building, or with respect to people, such as the friends of a user of the mobile device 400. The speaker module 420 may be configured to provide audible feedback to a user. In various embodiments, the speaker module 420 may be utilized as part of an action performed in association with a tag that is determined to satisfy one or more user preferences. For example, the mobile device 400 may audibly inform a user via the speaker module 420 that an item is on sale, that a particular brand item has been detected, that a needed service is being offered, or that a solicitation satisfying a user-specified condition has been identified.

The microphone module 425 may be configured to continuously and/or automatically scan an environment for audio tags. Additionally, or alternatively, the microphone module 425 may be configured to receive and process voice input from a user. For example, the microphone module 425 may be utilized by a user to provide voice commands, provide user preferences, and/or store voice memorandums. The data and/or charge port 430 may provide an interface to charge a power supply 440 and/or to upload or download data from storage and/or memory module 450. In one example, the data/charge port 430 may conform to an industry standard, such as universal serial bus (USB) or IEEE 1394 (FireWire). The processing unit 435 may perform visual, audio, and/or RF processing associated with one or more of the camera module 405, the speaker module 420 and an RF module 455. The processing unit 435 may also be configured to identify scanned tags that satisfy one or more user preferences. In some embodiments, the mobile device 400 does not include the processing unit 435; rather, the mobile device may be in communication with a remote processing unit.

The time signal module 445 may be configured to provide an accurate relative or absolute time. In some embodiments, the time signal module 445 may be in communication with a GPS receiver or include a voltage-controlled oscillator, a voltage-controlled crystal oscillator, and/or other time-keeping device. The data storage and/or memory may be accessible to various other modules 405-460 and may be adapted to store various user preferences. The RF module 455 may be configured to continuously and/or automatically scan a user environment for RF tags. For example, the RF module 455 may include a remote sensor, such as an RFID sensor, adapted to receive identification information from an electronic identification device (EID), such as an RFID tag. In some embodiments, the mobile device 400 includes a display interface module 460. The display interface module 460 may be configured to provide visual feedback to a user via a display, such as a liquid crystal display (LCD) or organic light-emitting diode (OLED) display. Furthermore, the display interface module 460 may be configured to receive user input via a touch interface associated with the display screen.

According to various embodiments, various modules 405-460 described in conjunction with FIG. 4 may be omitted and/or other modules not illustrated may be added to any given embodiment of the mobile device 400. For example, the mobile device 400 may include each of the camera module 405 for scanning image tags, the microphone module 425 for scanning audio tags, and the RF module 455 for scanning RF tags. Alternatively, the mobile device 400 may include only one of the camera module 405, the microphone module 425, and the RF module 455. Similarly, the mobile device 400 may rely on the processing unit 435 as a computing device, or the mobile device 400 may utilize a remote computing device instead of or in addition to the processing unit 435.

Figure 5A:
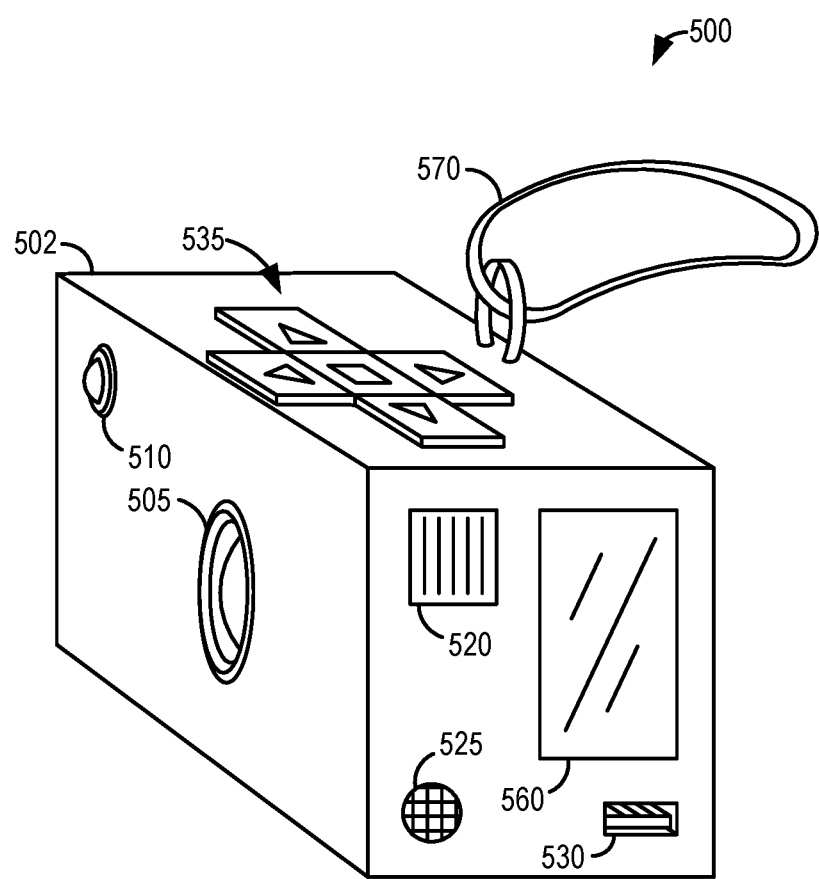
FIG. 5A is an exemplary embodiment of a personal mobile device configured to continuously and/or automatically scan a user environment for image data using a camera.

FIG. 5A is an exemplary embodiment of a personal mobile device 500 configured to continuously and/or automatically scan a user environment for image data using a camera 505. As illustrated, the personal mobile device 500 may include a case 502 with various peripheral input/output devices. The case 502 is merely illustrative and may be modified to have any shape, size, weight, or dimensions, and may be made from any of a wide variety of materials. Moreover, the case 502 may be omitted and the various functions and components of the mobile device 500 may be integrated into any of a wide variety of alternative portable electronic devices, such as cellular telephones and tablet computers.

As illustrated, the mobile device 500 may include various input buttons 535, a display screen 560, a data/charge port 530, a speaker 520, a microphone 525, and an LED 510. A strap 570, or other attachment device, may be used to secure the mobile device 500. For example, the strap 570 may be used to secure the mobile device 500 around the neck, shoulder, or wrist of a user. According to various embodiments, any of the various functions, operations, structures, and modules described in conjunction with FIGS. 1-4 may be integrated within the mobile device 500. Similarly, some of the various functions, operations, structures, and modules described in conjunction with FIGS. 1-4 may be performed remotely. For example, a wireless communication module may be integrated within the mobile device 500 enabling various data storage and/or processing operations to take place in a cloud computing environment rather than within the mobile device 500.

According to the illustrated embodiment, the camera 505 may be configured to continuously and/or automatically scan a user environment for image tags. A computing device, either a remote computing device or a computing device integrated within the mobile device 500, may then identify image tags that satisfy one or more user preferences and perform an associated action.

Figure 5B:
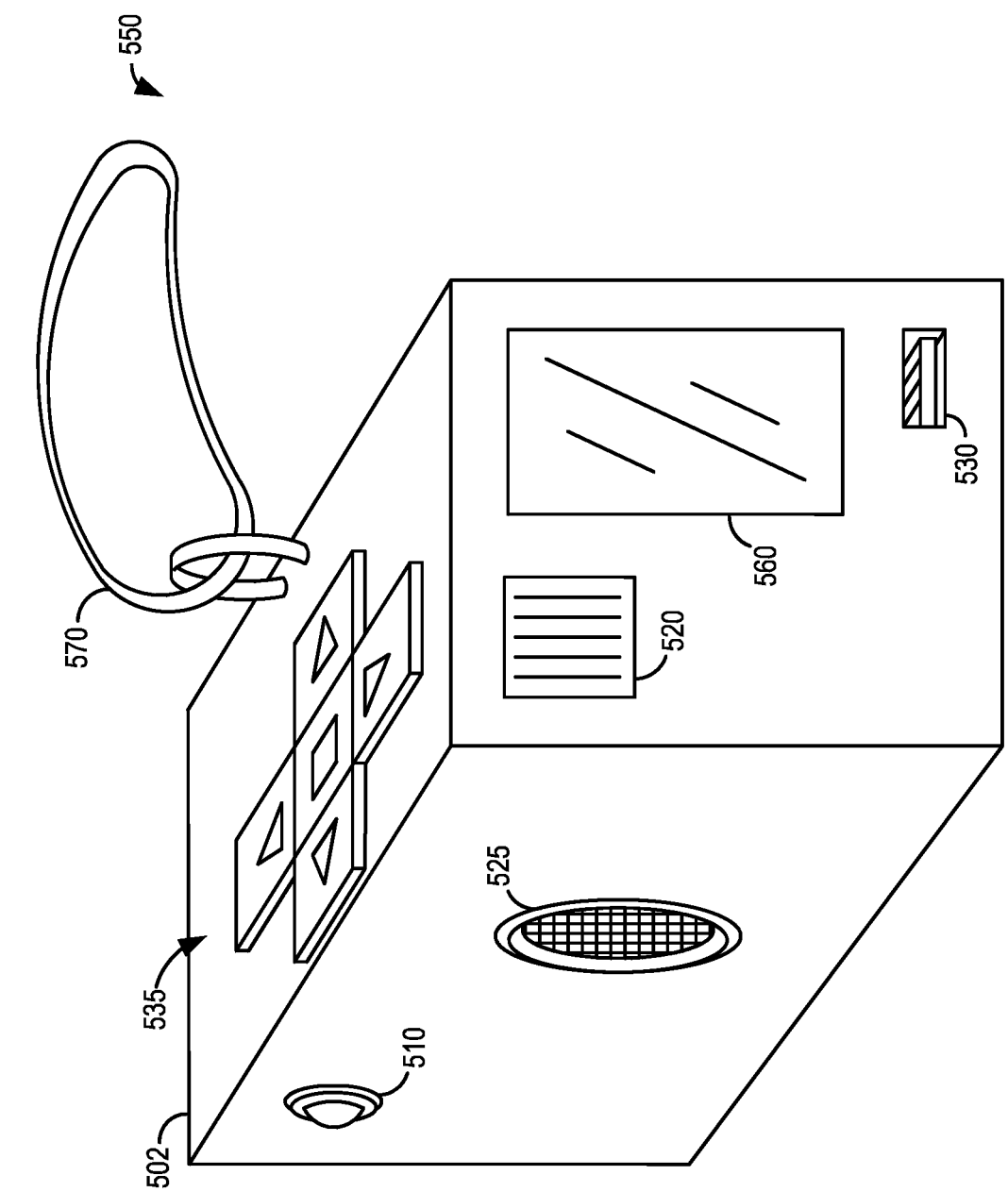
FIG. 5B is an exemplary embodiment of a personal mobile device configured to continuously and/or automatically scan a user environment for audio data using a microphone.
Figure 5C:
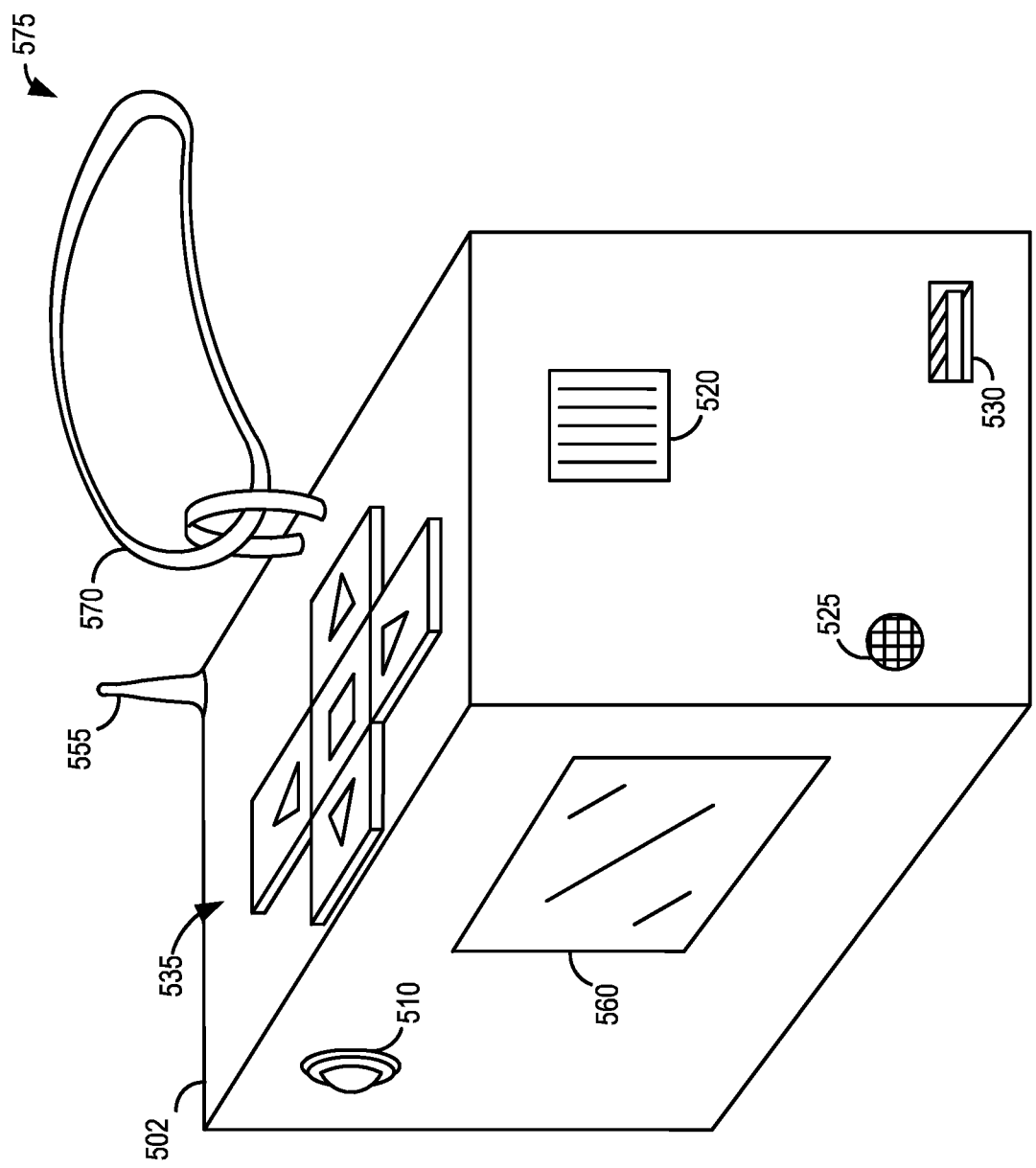
FIG. 5C is an exemplary embodiment of a personal mobile device configured to continuously and/or automatically scan a user environment for radio frequency (RF) data using an RF antenna.

The mobile device 550, illustrated in FIG. 5B, may not include a camera and may instead be adapted to scan for audio tags using a microphone 525. The personal mobile device 550 of FIG. 5B may include one or more of the various input buttons 535, the display screen 560, the data/charge port 530, the speaker 520, the LED 510, and the strap 570. In similar fashion, the mobile device 575, illustrated in FIG. 5C may include an RF antenna 555 configured to continuously and/or automatically scan a user environment for RF tags. The personal mobile device 575 may not include a camera, and is illustrated as having a larger display screen 560. Again, the shape, size, configuration, layout, and dimensions of the various components of the mobile device 575 may be adapted for a particular application. Specifically, some features may be omitted from some embodiments, integrated within other personal electronic devices, and/or performed by remote electronic devices.

Figure 6:
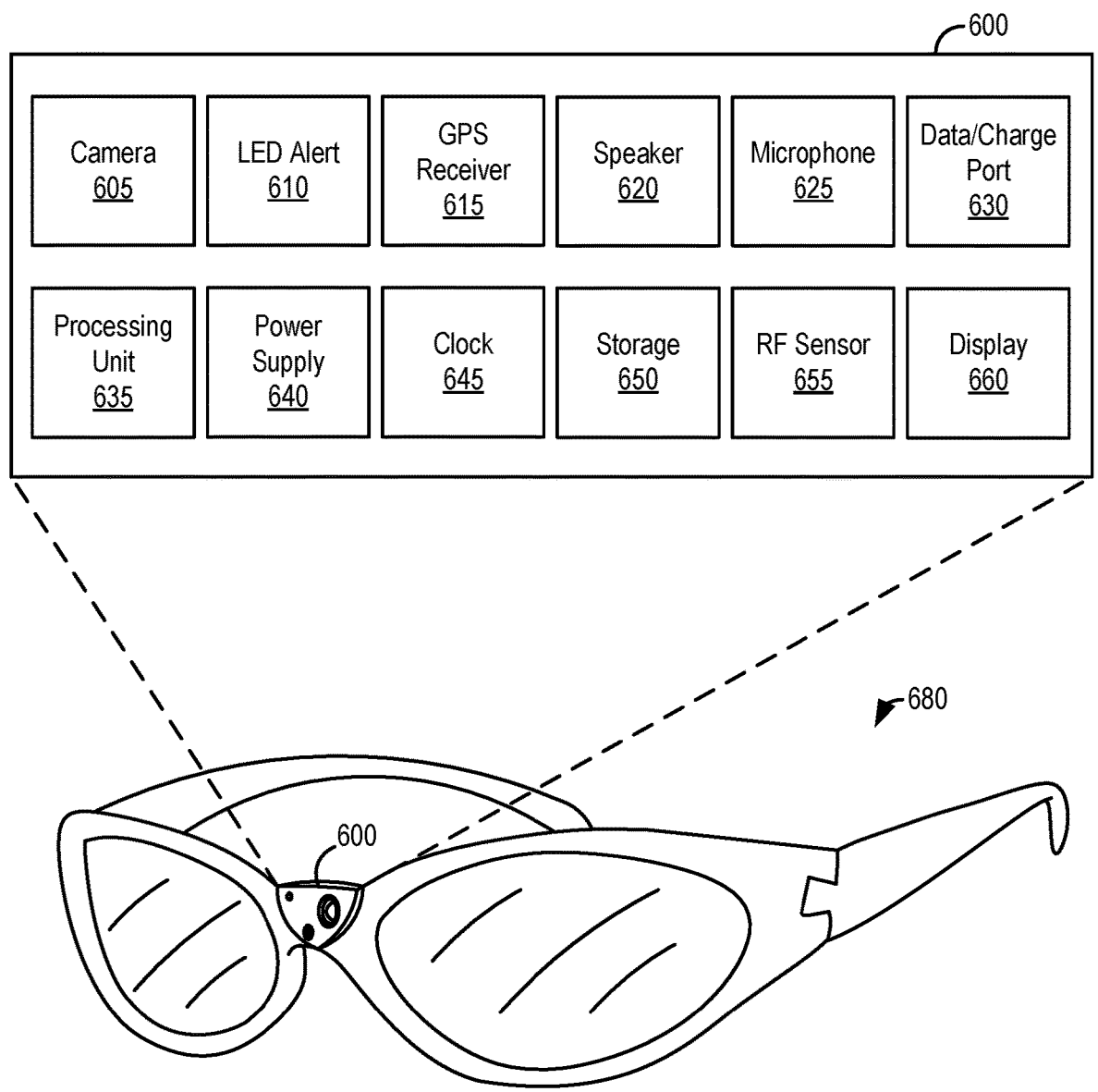
FIG. 6 is an exemplary embodiment of a personal mobile device integrated into eyeglasses, the personal mobile device configured to continuously and/or automatically scan a user environment for data.

FIG. 6 is an exemplary embodiment of a personal mobile device 600 integrated into eyeglasses 680. As illustrated, the eyeglasses 680 include a camera configured to continuously and/or automatically scan a user environment for image tags. The eyeglasses 680 are also illustrated with an RF antenna configured to continuously and/or automatically scan the user environment for RF tags and a microphone configured to continuously and/or automatically scan the user environment for audio tags. The mobile device 600 may include a camera 605, an LED alert 610, a GPS receiver 615, a speaker 620, a microphone 625, a data and/or charge port 630, a processing unit 635, a power supply 640, a clock 645, a data storage 650, an RF sensor 655, and a display 660. As may be appreciated by one of skill in the art, one or more of modules 605-660 may be omitted in order to reduce the overall size, power consumption, and/or weight of the mobile device 600.

Additionally, one or two of the camera 605, the RF sensor 655 and associated antenna, and the microphone 625 may be omitted from the mobile device 600. In such embodiments, a wireless communication module may connect one or more of the camera, the RF antenna, and the microphone to a remote device configured to perform one or more of the functions associated with modules 605-660. For example, in one embodiment, the eyeglasses 680 may include only the camera 605, a power supply 640, and a communication module (either wireless or via the data port 630).

In such an embodiment, the camera 605 may be configured to continuously and/or automatically scan a user environment for image tags and transmit (wireless or via the data port 630) scanned image tags to a remote device capable of identifying those image tags that satisfy one or more user preferences. The remote device may then perform an action in response to the image tags that satisfied the one or more user preferences. In one embodiment, the mobile device 600 may further include a feedback mechanism, such as LED alert 610 or the display 660, capable of providing feedback to a user wearing the eyeglasses 680. Any of the various functions, operations, structures, and modules described in conjunction with FIGS. 1-4 may be integrated within or performed by the mobile device 600. Similarly, some of the various functions, operations, structures, and modules described in conjunction with FIGS. 1-4 may be performed remotely.

Figure 7:
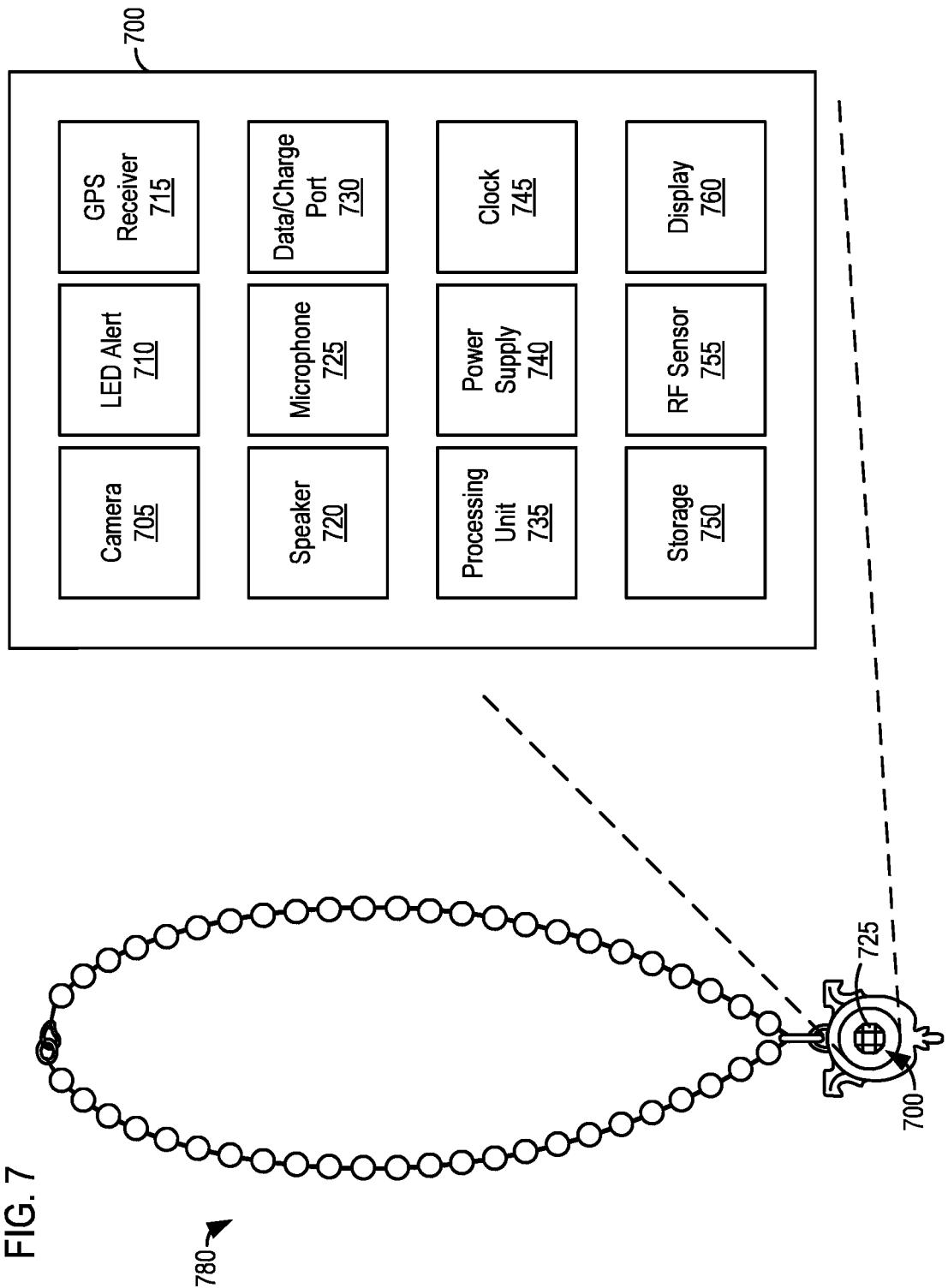
FIG. 7 is an exemplary embodiment of a personal mobile device integrated into a necklace, the personal mobile device configured to continuously and/or automatically scan a user environment for data.

FIG. 7 is an exemplary embodiment of a personal mobile device 700 integrated into a necklace 780. As illustrated, the mobile device 700 may include a microphone 725 configured to continuously and/or automatically scan a user environment for audio tags. Additionally, the mobile device 700 may include one or more of the modules 705-760. For example, the mobile device 700 may include a camera 705, an LED alert 710, a GPS receiver 715, a speaker 720, a microphone 725, a data and/or charge port 730, a processing unit 735, a power supply 740, a clock 745, a data storage 750, an RF sensor 755, and a display 760. Again, as may be appreciated by one of skill in the art, one or more of the modules 705-760 may be omitted in order to reduce the overall size, power consumption, and/or weight of the mobile device 700.

In such embodiments, the data port 730 and/or a wireless communication module may facilitate communication between the microphone 725 in the necklace 780 and other of the modules 705-760 in a remote device. Accordingly, the microphone 725 may continuously and/or automatically scan a user environment for audio tags and transmit scanned audio tags (wirelessly or via the data port 730) to a remote device configured to identify those audio tags that satisfy one or more user preferences. The remote device may then perform an action in response to the audio tags that satisfied the one or more user preferences. In some embodiments, some processing and/or data storage may be performed locally within the mobile device 700 integrated within the necklace 780. Any of the various functions, operations, structures, and modules described in conjunction with FIGS. 1-4 may be integrated within or performed by the mobile device 700, and, as described herein, some of the functions, operations, structures, and modules described in conjunction with FIGS. 1-4 may be performed remotely.

Audio tags may comprise audio generated using parametric ultrasonic techniques, audio from an electromechanical speaker, audio from a radio broadcast, audio from a live event, or audio from a television broadcast. The audio tags may be ultrasonic, subsonic, and/or within the range of human hearing. According to various embodiments, audio tags, at any frequency range, may be embedded or encoded within audio detectable by a human user. In some embodiments, an audio tag may be embedded as an audio watermark within other audio content.

FIG. 8 is an exemplary embodiment of a personal mobile device 800 integrated into a hat 880. As illustrated, the mobile device 800 may include an antenna 854 configured to continuously and/or automatically scan a user environment for RF tags. A computing device may identify those scanned RF tags that satisfy one or more user preferences. The mobile device 800 may include one or more of the modules 805-860. That is, the personal mobile device 800 may include a camera 805, an LED alert 810, a GPS receiver 815, a speaker 820, a microphone 825, a data and/or charge port 830, a processing unit 835, a power supply 840, a clock 845, a data storage 850, an RF sensor 855, and a display 860. Again, as may be appreciated by one of skill in the art, one or more of the modules 805-860 may be omitted in order to reduce the overall size, power consumption, and/or weight of the mobile device 800.

The data port 830 and/or a wireless communication module may facilitate communication between the RF antenna 854 (and associated RF sensor 855) in hat 880 and other of the modules 805-860 in a remote device. Accordingly, the RF antenna 854 and the RF sensor 855 may continuously and/or automatically scan a user environment for audio tags and transmit scanned RF tags (wirelessly or via the data port 830) to a remote device configured to identify those RF tags that satisfy one or more user preferences. The remote device may then perform an action in response to the RF tags that satisfied the one or more user preferences. In some embodiments, some processing and/or data storage may be performed locally within the mobile device 800 integrated within the hat 880. Any of the various functions, operations, structures, and modules described in conjunction with FIGS. 1-4 may be integrated within or performed by the mobile device 800, and some of the functions, operations, structures, and modules described in conjunction with FIGS. 1-4 may be performed remotely by a remote computing device.

Figure 9A:
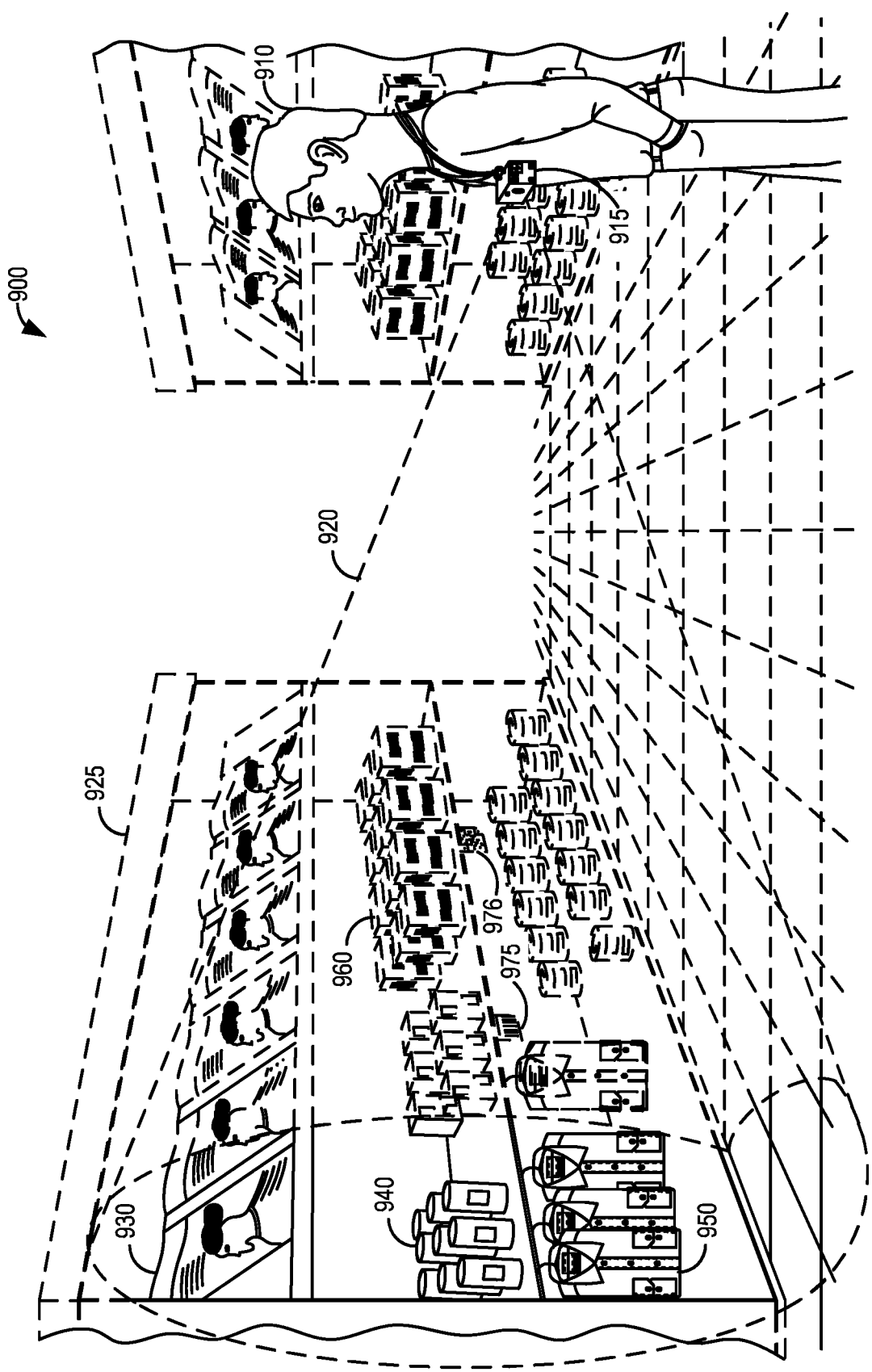
FIG. 9A illustrates a personal mobile device used to continuously and/or automatically scan shelves in a retail establishment for tags containing non-human-readable data, the personal mobile device having a narrow field of view.

FIG. 9A illustrates a personal mobile device 915 used to continuously and/or automatically scan a portion of the shelves 925 in a retail establishment 900 for tags containing non-human-readable data. The mobile device 915 is illustrated as having a relatively narrow field of view 920. As illustrated, the field of view 920 encompasses only the portion of the shelves 925 that are shown in solid lines. Accordingly, the portion of the shelves 925 shown in dashed lines may be outside the field of view 920 of the mobile device 915. In some embodiments, the mobile device 915 may be configured with a relatively narrow field of view 920 and be adapted to sweep across a wider area, such as the shelves 925. Alternatively, the mobile device 915 may include a field of view that is narrower than the field of view 920 illustrated in FIG. 9A. In such an embodiment, the mobile device 915 may be adapted to sweep the relatively narrow field of view across the field of view 920 shown in FIG. 9A.

The mobile device 915 may be configured to be worn around the neck of the user 910, or may alternatively be integrated within the clothing or other accessory of the user 910. The field of view 920 may be adjustable or fixed. As previously described, the shape, size, configuration, layout, and available functions and peripheral input/outputs of the mobile device 915 may be modified, omitted, or augmented for a particular application.

Alternatively, the mobile device 915 may be selectively and/or temporarily carried by the user 910. For example, user 910 may be handed the mobile device 915 upon entering the retail establishment 900. The mobile device 915 may be temporarily provided to the user 910 until the user 910 leaves the retail establishment 900. In such embodiments, the mobile device 915, may be carried by, worn by, and/or otherwise associated with the location of the user 910 while the user 910 is in the retail establishment 900.

According to the illustrated embodiment, the mobile device 915 may be configured to continuously and/or automatically scan the shirts 950, the cans 940, and the print material 930 for associated tags. According to various embodiments, the mobile device 915 may continuously and/or automatically scan for RF tags, image tags, and/or audio tags. For example, the shirts 950 may be associated with tags containing non-human-readable data in the form of an RFID tag or an image tag, such as a QR code. The user 910 may visually observe each of the print material 930, the cans 940, and the shirts 950; however, the mobile device 915 may scan tags associated with each of them and identify those tags that satisfy one or more user preferences.

For example, the user 910 may not notice that the print material 930 contains a coupon for a new bicycle. The mobile device 915, while continuously and/or automatically scanning the environment, may scan a tag containing non-human-readable data associated with the print material 930. A computing device (remote or local to the mobile device 915) may determine that the scanned tag satisfied a user preference. The satisfied user preference indicating an interest in bicycles may have been user-provided, based on social network information, deduced from available information related to the user, and/or otherwise determined. The computing device may then determine what action should be taken in response to identifying a tag that satisfied a user preference.

The action taken may be with respect to the user 910 and/or a third party. For example, the mobile device 915 may provide an audible alert, a visual alert, vibrate, send a message or email to the user 910, and/or update a webpage, database, blog, and/or social network site. The mobile device 915 may additionally, or alternatively, notify a third party. For instance, the mobile device 915 may transmit a purchase order for the bicycle or the print material 930, request the coupon, and/or request additional information about the print material 930, the coupon, or the bicycle. The mobile device 915 may transmit information to a third party related to the user 910, such as demographic information, contact information, a username, a password, financial information, and/or other information related to the user 910. Such information may be provided to a third party anonymously or with personal identifying information.

FIG. 9B illustrates the mobile device 915 used to continuously and/or automatically scan the shelves 925 of the retail establishment 900 for image tags, such as the barcode 975 and QR code 976. The mobile device 915 may have a relatively wide field of view 922 corresponding to about the same field of view the user 910 may have. Accordingly, the mobile device 915 may continuously and/or automatically scan approximately the same portion of the retail establishment 900 that the user 910 visually observes. In one embodiment, the human-readable advertisement 930, advertising a 50% off sale, may be observed by the user 910. An underlying image tag containing non-human-readable data may also be associated with the advertisement 930. If the image tag associated with the advertisement 930 satisfies one or more user preferences, then the mobile device may perform an action, such as alerting the user 910, uploading information, and/or storing the information for later use.

Similarly, the mobile device 915 may scan the barcode 975 and the QR code 976 associated with the boxed items 960. In one embodiment, the QR code 976 may satisfy one or more user preferences and the user 910 may be alerted that the boxed items 960 are within his field of view. As an example, the user 910 may have routinely purchased the boxed items 960 in the past. The mobile device 915 may have automatically included a user preference to look for the boxed items 960 at a price below a certain price point. The mobile device 915 may have scanned the QR code 976, identified that the boxed items were below the price point (therefore satisfying a user preference), and taken an action to alert the user 910. The field of view 922 of the mobile device 915 may be fixed or adjustable and may be made narrower or wider than illustrated. In some embodiments, particularly in those embodiments including audio or RF scanning, the field of view may be limited only by the range of communication.

Figure 10A:
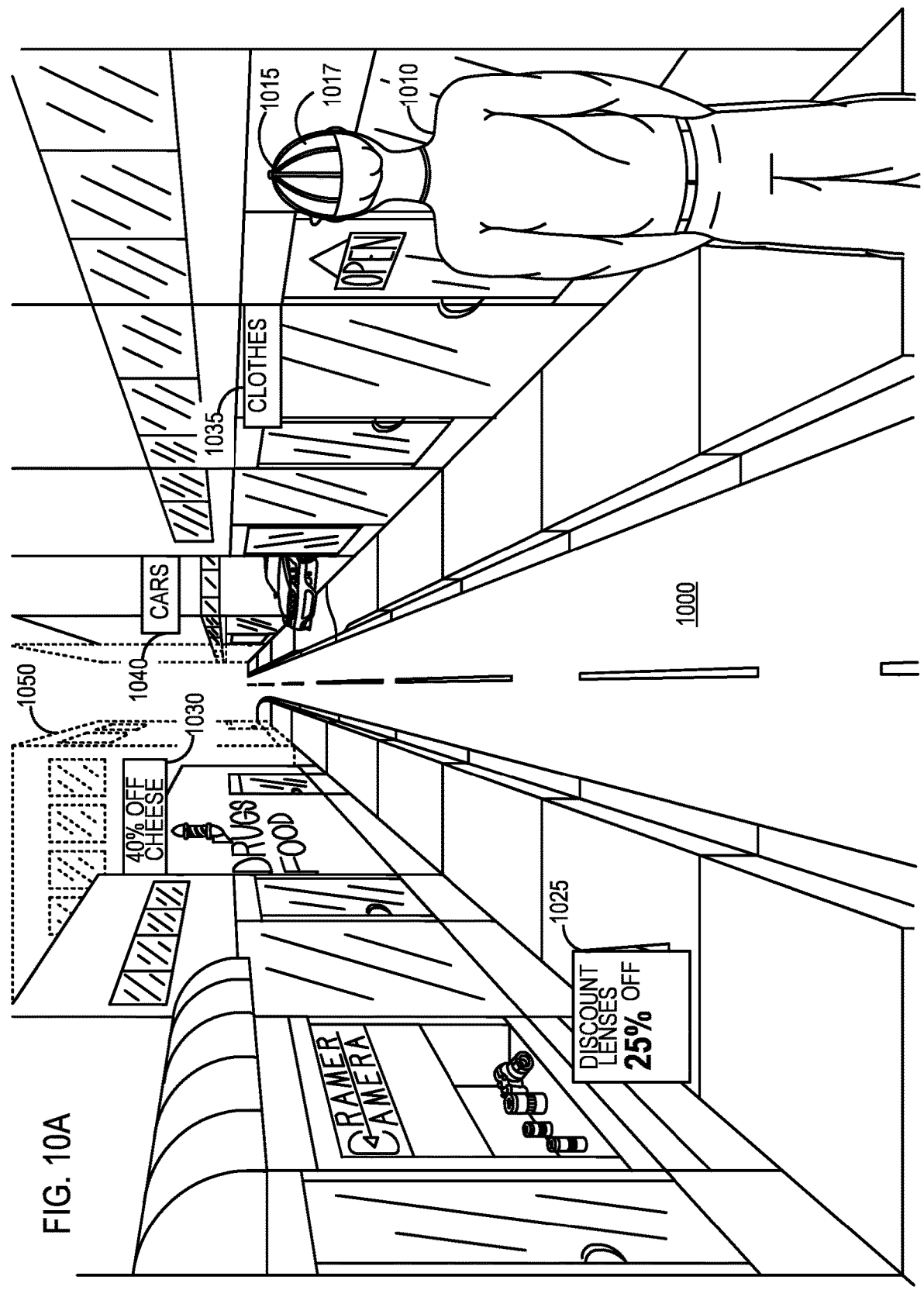
FIG. 10A illustrates a personal mobile device integrated into a hat of a user, the personal mobile device configured to continuously and/or automatically scan a shop front environment for data.

FIG. 10A illustrates a personal mobile device 1015 integrated into a hat 1017 of a user 1010. The personal mobile device 1015 may be configured to continuously and/or automatically scan a shop front environment 1000 for image tags containing non-human-readable data. Some portions of the shop front environment 1000 may be out of range, such as the building 1050 illustrated in dashed lines. The personal mobile device 1015 may alternatively be configured to continuously and/or automatically scan the shop front environment 1000 for audio tags containing non-human-readable data. Alternatively, as illustrated in FIG. 10B, the mobile device 1015 may be configured to continuously and/or automatically scan the shop front environment 1000 for RF tags containing non-human-readable data.

As illustrated in FIG. 10A, the shop fronts may contain various advertisements, information, and/or promotions visually available to the user 1010, such as a discount on camera lenses 1025, cheese 1030, cars 1040, and clothes 1035. Each shop front, advertisement, product, promotion, or information piece may also include non-human-readable data in the form of an image tag, an audio tag, and/or an RF tag. The mobile device 1015 may continuously and/or automatically scan the shop fronts for such tags. The mobile device 1015, or a computing device in communication with the mobile device 1015, may identify those tags that satisfy one or more user preferences. It may be useful to decrypt the tags and/or verify that the scanned or identified tags are authentic.

Once a tag has been identified that satisfies one or more user preferences, the computing device may perform an action. The action taken may be depend on the user preferences, the identified tag, a third party's instructions, and/or the user's instructions. Any of the various functions, operations, structures, and modules described in conjunction with FIGS. 1-4 may be integrated within or performed by the mobile device 1015, and some of the functions, operations, structures, and modules described in conjunction with FIGS. 1-4 may be performed remotely by a remote computing device in communication with the mobile device 1015.

Figure 10B:
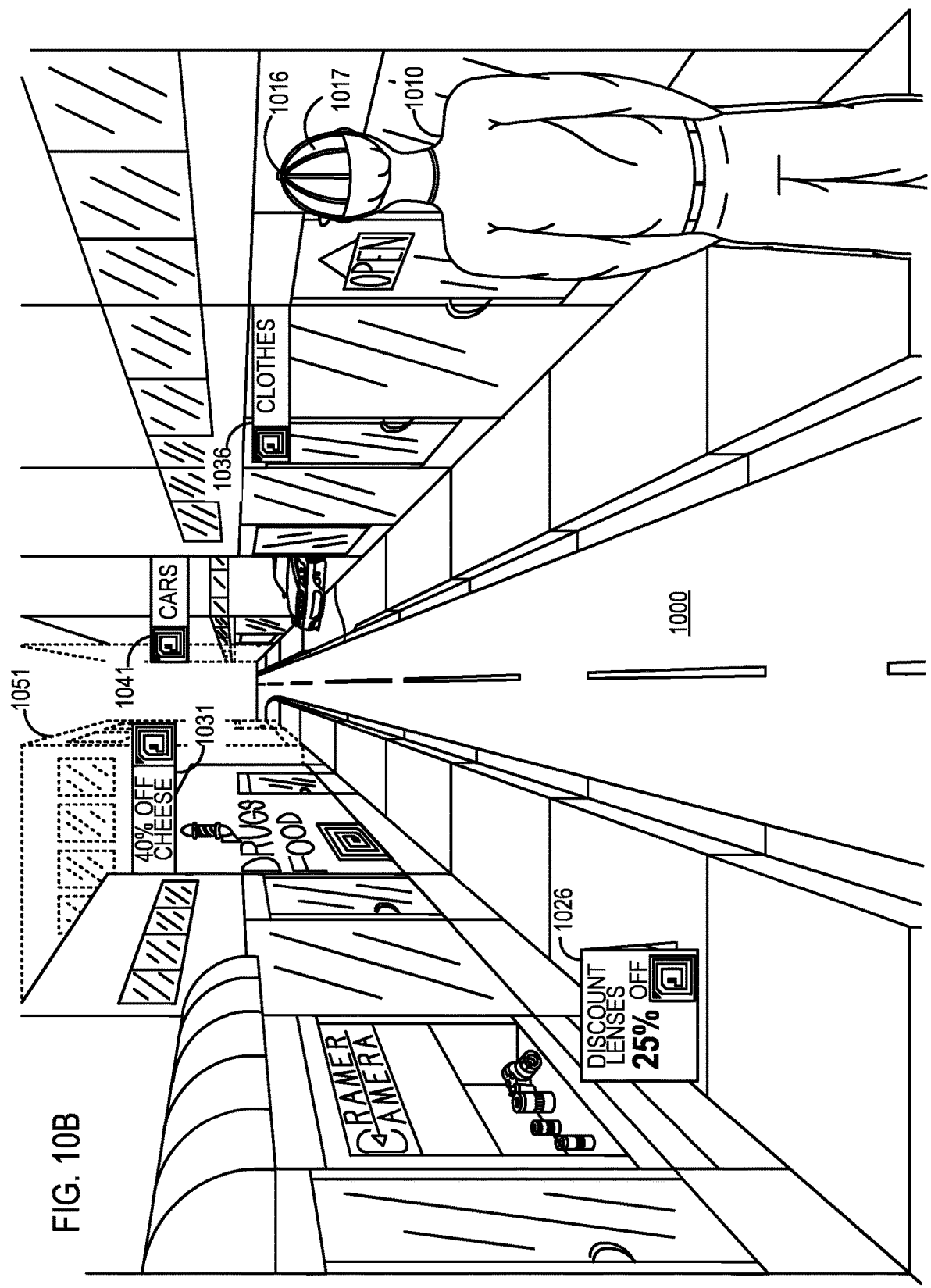
FIG. 10B illustrates the personal mobile device integrated into the hat of the user, the personal mobile device specifically configured to continuously and/or automatically scan the shop front environment for RF data.

As previously described, FIG. 10B illustrates a mobile device 1016 integrated into the hat 1017 of the user 1010 configured to continuously and/or automatically scan the shop front environment 1000 for RF tags. In the illustrated embodiments, each shop front may include an RFID tag, such as tags 1026, 1031, 1036, and 1041. Again, the range of the mobile device 1016 may be selectively or technologically limited, as illustrated by the building 1051 shown in dashed lines that cannot be scanned.

Figure 11:
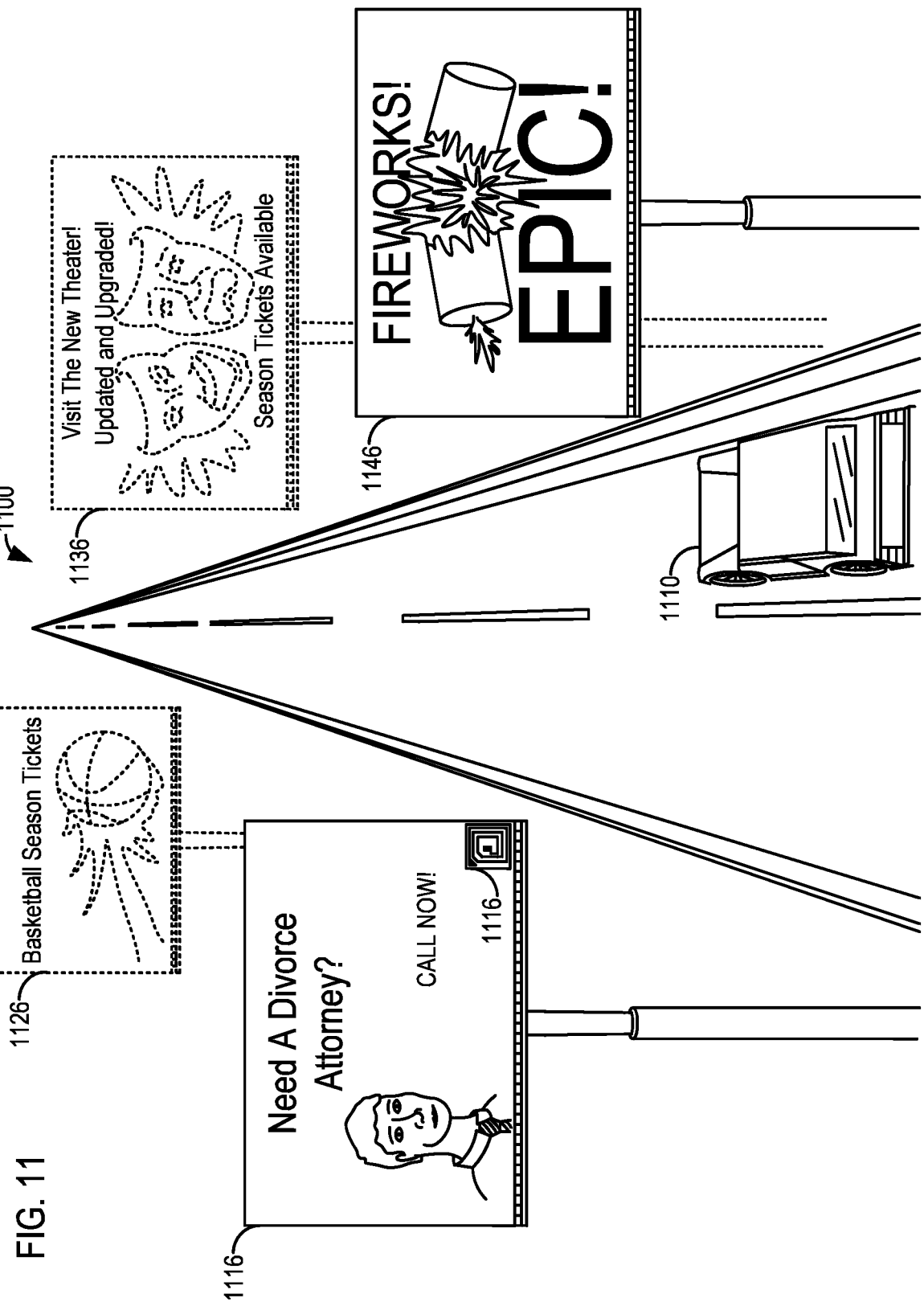
FIG. 11 illustrates a personal mobile device integrated within a vehicle to continuously and/or automatically scan a billboard environment for data.

FIG. 11 illustrates another example of a use for a personal mobile device that is integrated within or used from within a vehicle 1110. The mobile device may continuously and/or automatically scan a billboard environment 1100 for tags containing non-human-readable data. Tags associated with each of the billboards 1116, 1126, 1136 and 1146 may be continuously and/or automatically scanned by the mobile device within the vehicle 1110. The tags may include image tags, audio tags, and/or RF tags; the mobile device may be adapted to continuously and/or automatically scan for one or more types of tags. As illustrated in FIG. 11, the tags associated with the billboards 1116 and 1146 may be in range of the vehicle 1110, while the tags associated with the billboards 1126 and 1136 may not yet be within scanning range. The range and field of view of the mobile device may be adjustable or fixed and may be limited by third parties, user preferences, technology, and/or other limiting factors.

Figure 12:
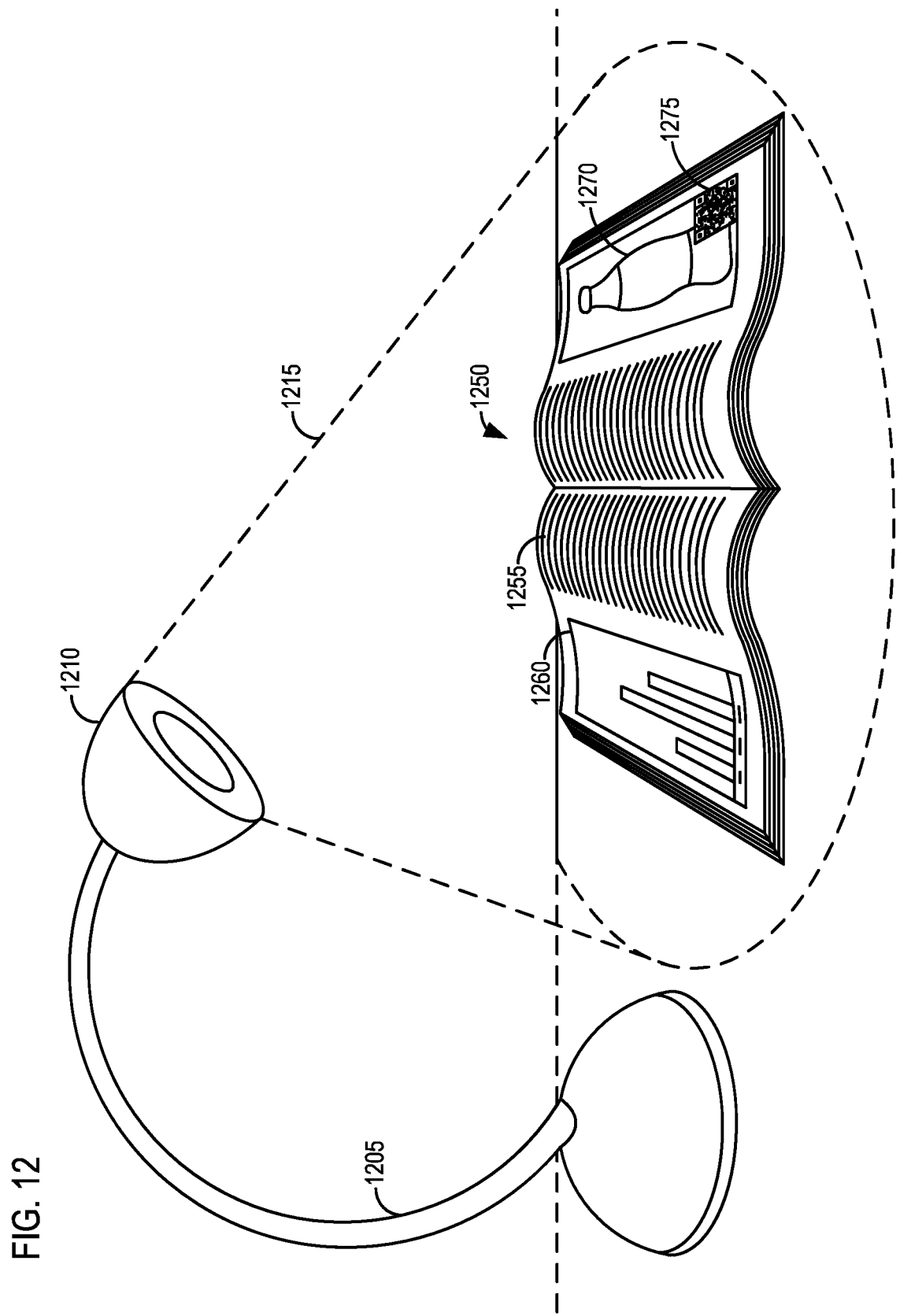
FIG. 12 illustrates a personal mobile device configured to continuously and/or automatically scan the pages of a magazine for data.

FIG. 12 illustrates another example of a use for a personal mobile device 1210. As illustrated, the mobile device 1210 may be integrated into a desk lamp or stand 1205. The field of view 1215 of the mobile device 1210 may be adapted to correspond to the surface of the desk or to accommodate a particular size of print material. In the illustrated embodiment, the mobile device 1210 is configured to continuously and/or automatically scan the pages of a magazine 1250 for tags. The tags may be image tags, such as the QR code 1275 associated with the soda advertisement 1270, or image tags embedded or hidden within the text 1255 and the graph 1260. The magazine 1250 may alternatively or additionally include RF and/or audio tags.

In the illustrated embodiment, as a user turns the pages of the magazine 1250, the mobile device 1210 may continuously and/or automatically scan each page for image tags. A computing device, either remote or integrated within the mobile device 1210, may identify tags that satisfy one or more user preferences. If a tag is identified that satisfies one or more user preferences, then the computing device may perform a responsive action. For example, the mobile device may audibly, visually, vibrationally, haptically or otherwise provide an alert to the user. Any of the various functions, operations, structures, and modules described in conjunction with FIGS. 1-4 may be integrated within or performed by the mobile device 1210, and some of the functions, operations, structures, and modules described in conjunction with FIGS. 1-4 may be performed remotely by a remote computing device.

As an example, the user preferences may include advertisements for certain products at or below a certain price point. Accordingly, rather than read each advertisement within the magazine 1250, a user may quickly turn the pages of the magazine and allow the mobile device 1210 to identify any tags, such as the QR code 1275, that satisfy one or more user preferences. As previously described, the mobile device 1210 may then perform an action in response to the identified tag, such as alerting the user, storing the information obtained from the identified tag, obtaining and/or storing supplemental information obtained from the identified tag, and/or other action.

Figure 13A:
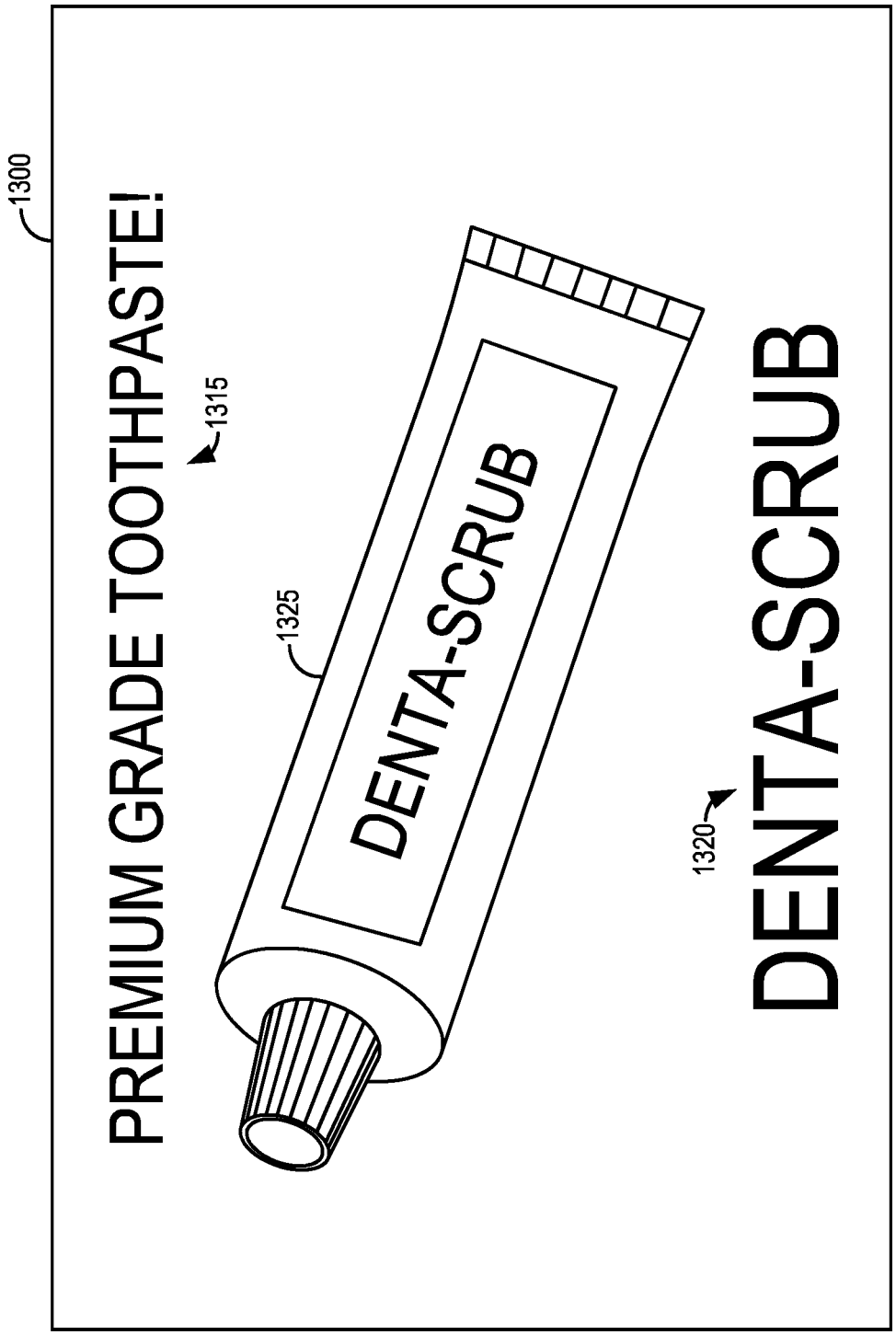
FIG. 13A illustrates an advertisement containing image data and textual data that can be read by a personal mobile device.

FIG. 13A illustrates an advertisement 1300 containing image data 1325 and textual data 1315 and 1320 that can be read by a personal mobile device, according to various embodiments. In addition to data visually or audibly available to an observant user, the advertisement 1300 may include tags containing non-human-readable data. For example, the advertisement 1300 may include QR codes, steganographic content, audio watermarks, audio outside of a human audible range, RFID tags, LWID tags, NFC tags, a Memory Spot device, and/or other image tags, RF tags, and/or audio tags.

In other embodiments, the advertisement 1300 may include image data that is only readable using polarization-dependent imaging or spectrally-limited imaging. For instance, the image data may only appear with horizontal (or other) polarization. The total image may include imagery that is either unpolarized or includes both horizontal and vertical polarizations. Accordingly, a user may not notice the insignificant portion of the image that is polarized, while the mobile device may scan only that information that is polarized (i.e., horizontal, vertical, left-hand circular, or right-hand circular).

Similarly, a tag may be encoded within an image using spectrally-limited imaging. In such embodiments, the image visible to a user may include image data that is within a narrow range of the visible spectrum. The content within the narrow bandwidth may not obstruct or otherwise impair the user's view of the image, while the mobile device may be adapted to scan for tags within the narrow bandwidth. For instance, an image may include imagery between approximately 400 nanometers and 700 nanometers. The image data for a tag may be encoded between 430 nanometers and 450 nanometers. The relatively insignificant portion of the bandwidth used for the tag may be unnoticeable to a user, while the mobile device may be adapted to ignore anything outside of the relatively narrow bandwidth.

Tags associated with the advertisement 1300 may provide the same information available to the user, provide related information, and/or contain or provide a link to supplemental content. The supplemental content may be in the form of informational data related to the tag, a filename, a web address, an IP address, a MAC address, an email address, a social network handle or address, a messaging address, a phone number, a telephone address, a VoIP address, a fax number, a search term, a keyword, and/or other supplemental content. Supplemental content obtained from an identified tag may be directly provided to a user, stored for eventual retrieval, aggregated with related supplemental content or tags, and/or provided to the user in the aggregate with other related supplemental content or tags.

Figure 13B:
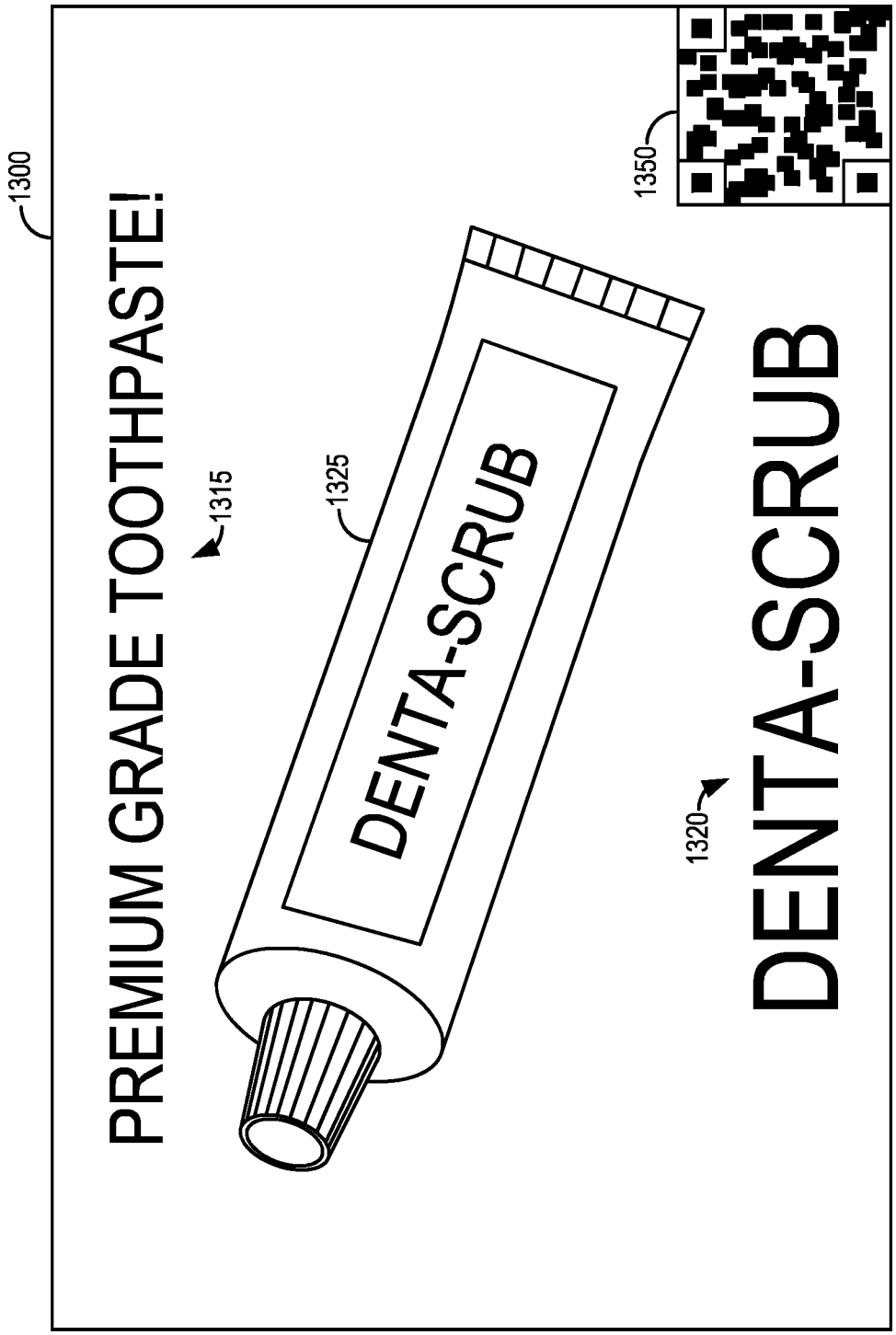
FIG. 13B illustrates the advertisement with an included matrix barcode that can be read by a personal mobile device.

FIG. 13B illustrates the advertisement 1300 with an included matrix barcode 1350, also known as a QR code, that can be scanned by a personal mobile device. The QR code 1350 may be visible to a user, or may alternatively be invisible to the user. For example, the QR code 1350 may be steganographically encoded in the image 1325, visible in the ultraviolet or infrared spectrum, too small for the human eye, and/or otherwise only machine-readable. The QR code 1350 may provide information related to the advertisement 1300 or may be entirely unrelated.

Figure 13C:
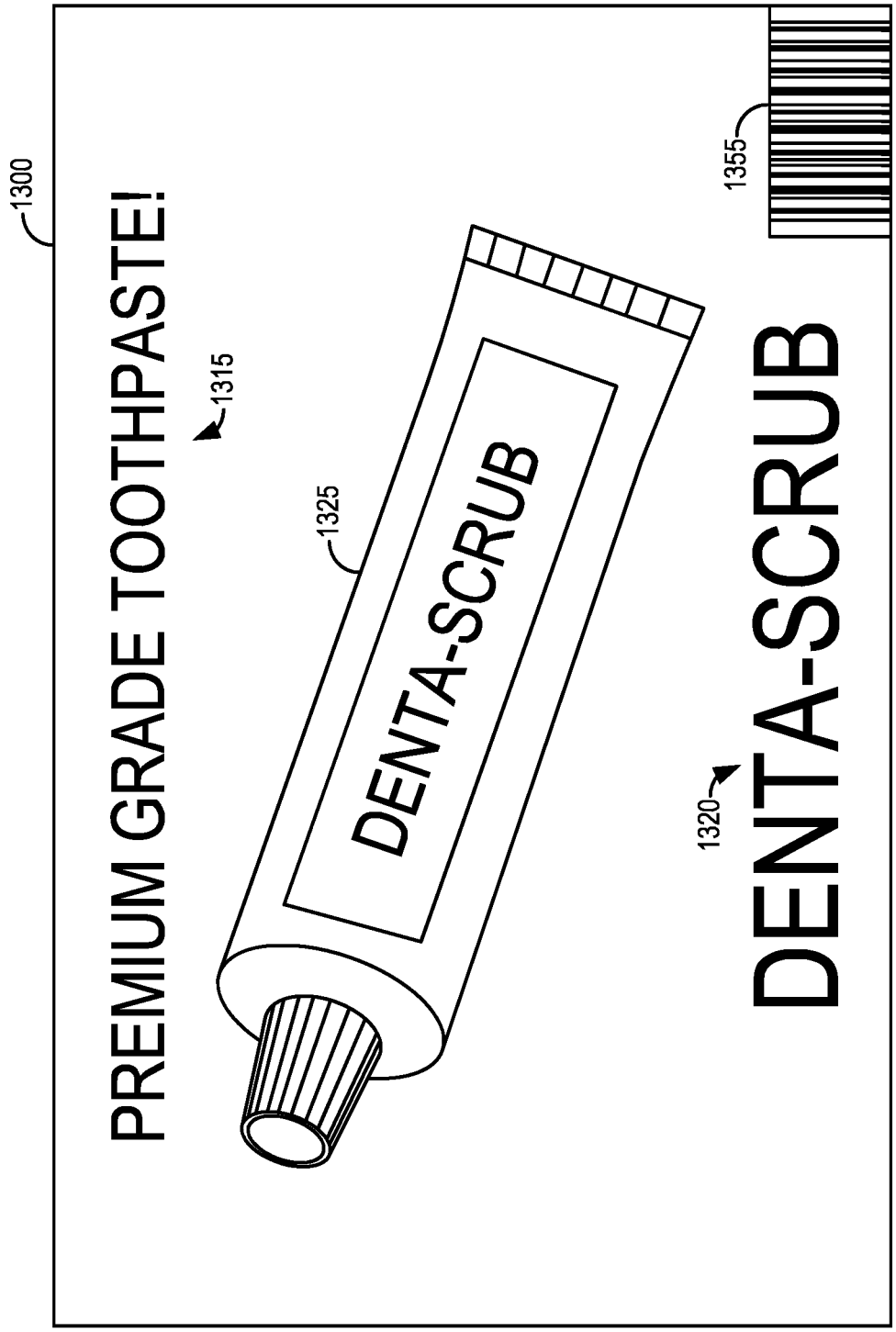
FIG. 13C illustrates the advertisement with an included barcode that can be read by a personal mobile device.

FIG. 13C illustrates the advertisement 1300 with a barcode 1355 that can be scanned by a personal mobile device. The barcode 1355 may be steganographically encoded in the image 1325, visible in the ultraviolet or infrared spectrum, too small for the human eye, and/or otherwise only machine-readable.

Figure 13D:
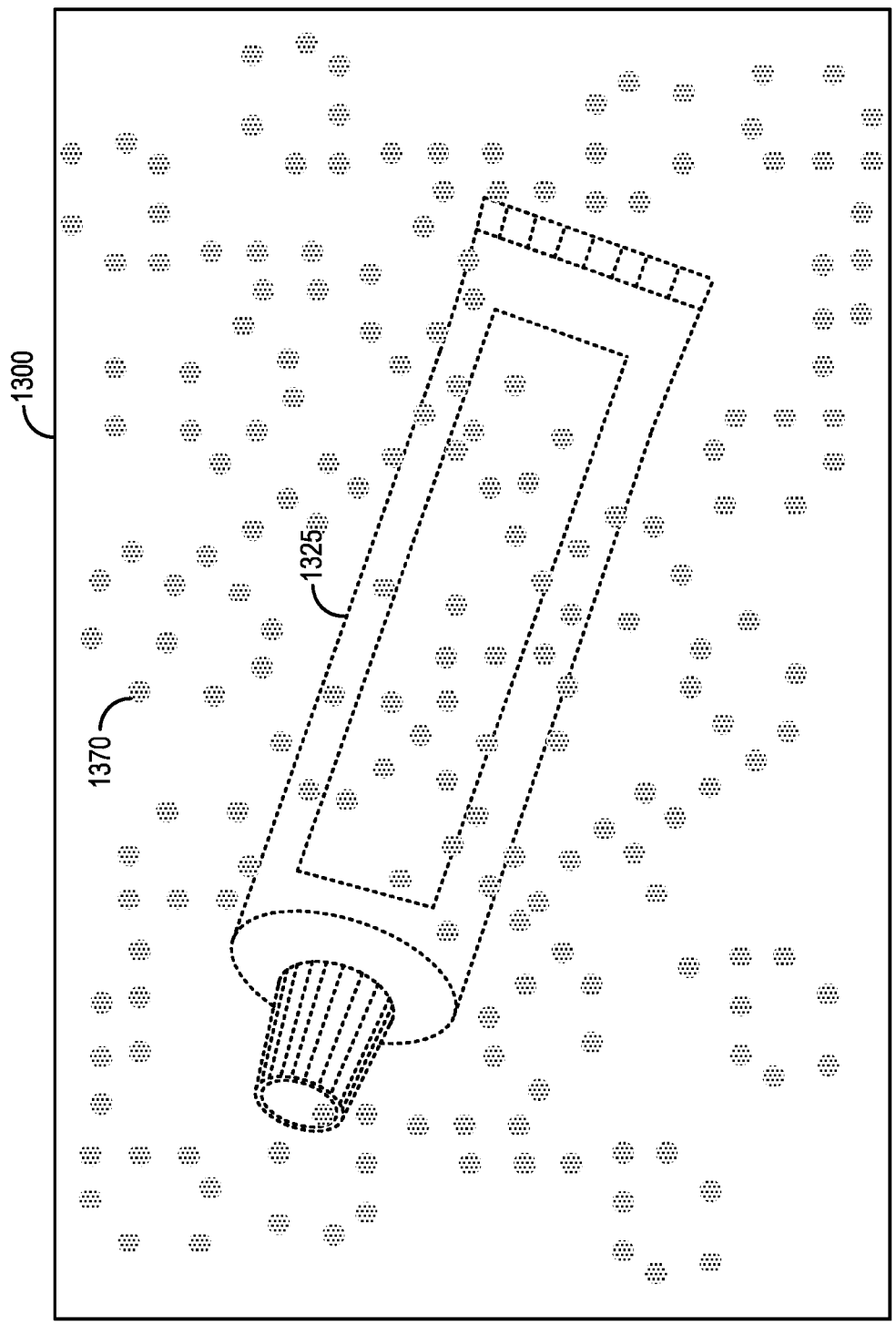
FIG. 13D illustrates the advertisement with an included steganographic image visible only to a personal mobile device.

FIG. 13D illustrates the advertisement 1300 with an included steganographic image comprising a matrix of dots 1370 not visible or noticeable to a human user. The matrix of dots 1370 may be visible only in the ultraviolet or infrared range and/or otherwise invisible or not distracting from the underlying image of toothpaste 1325. A mobile device may scan the matrix of dots 1370 and determine if the associated information satisfies one or more user preferences. The use of advertisements as examples in FIGS. 13A-13D is merely illustrative; the presently described mobile device may be adapted to continuously and/or automatically scan any environment containing any type of information, including, but not limited to, advertisements, store fronts, museums, shopping malls, retail establishments, roads, sidewalks, areas proximate the user of a mobile device, areas within visual range of a user of a mobile device, store displays, print media, television, photographs, movies, theaters, and/or other environments in which tags may be placed.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

Additionally, as will be appreciated by one of ordinary skill in the art, principles of the present disclosure may be reflected in a computer program product on a computer-readable storage medium having computer-readable program code means embodied in the storage medium. Any tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create a means for implementing the functions specified. These computer program instructions may also be stored in a computer-readable memory that can direct a computer or other programmable data processing apparatus to function in a particular manner, such that the instructions stored in the computer-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. A method for capturing and evaluating data of interest to a user, comprising:
    automatically scanning a user environment by a mobile device for tags containing non-human-readable data without the mobile device being specifically directed at a particular tag, wherein at least some of the tags specify one or more links to supplemental content;
    continuously identifying tags within the user environment that satisfy one or more preferences;
    aggregating a plurality of links associated with the identified tags;
    retrieving the supplemental content associated with one or more of the plurality of aggregated links; and
    presenting the plurality of aggregated links to a user.

2. The method of claim 1, wherein the tag comprises at least one of a radio-frequency identification (RFID) tag, a long wavelength identification (LWID) tag, a near field communication (NFC) device and a Memory Spot device.

3. The method of claim 1, wherein at least one preference is specified by a user.

4. The method of claim 1, wherein at least one preference is specified by a third party.

5. The method of claim 1, wherein at least one preference is obtained from social media information.

6. The method of claim 1, wherein at least one preference is based on a user's location.

7. The method of claim 1, wherein at least one preference is derived from information related to a user.

8. The method of claim 1, wherein at least preference is based at least in part on historical user input or actions.

9. The method of claim 1, wherein the computing device is integrated into the mobile device.

10. A system for capturing and evaluating data of interest to a user, comprising:
    a mobile device to automatically scan a physical user environment for one or more tags containing non-human-readable data without the mobile device being specifically directed at a particular tag, wherein at least some of the tags specify one or more links to supplemental content; wherein the mobile device continuously identifies tags within a physical user environment that satisfy one or more preferences and aggregates a plurality of links associated with the identified tags; and
    a computing device to present the plurality of aggregated links to a user, wherein, prior to presenting the plurality of aggregated links to the user, the computing device retrieves the supplemental content associated with one or more of the plurality of aggregated links.

11. The system of claim 10, wherein the tag comprises at least one of a radio-frequency identification (RFID) tag, a long wavelength identification (LWID) tag, a near field communication (NFC) device and a Memory Spot device.

12. The system of claim 10, wherein at least one preference is specified by a user.

13. The system of claim 10, wherein at least one preference is specified by a third party.

14. The system of claim 10, wherein at least one preference is obtained from social media information.

15. The system of claim 10, wherein at least one preference is based on a user's location.

16. The system of claim 10, wherein at least one preference is derived from information related to a user.

17. The system of claim 10, wherein at least preference is based at least in part on historical user input or actions.

18. The system of claim 10, wherein the computing device is integrated into the mobile device.

* * * * *